United States Patent
Yoshimura et al.

(10) Patent No.: US 11,617,191 B2
(45) Date of Patent: Mar. 28, 2023

(54) TERMINAL APPARATUS, BASE STATION APPARATUS, AND COMMUNICATION METHOD FOR PUCCH RESOURCE SELECTION

(71) Applicants: SHARP KABUSHIKI KAISHA, Sakai (JP); FG Innovation Company Limited, Tuen Mun (HK)

(72) Inventors: Tomoki Yoshimura, Sakai (JP); Shoichi Suzuki, Sakai (JP); Wataru Ouchi, Sakai (JP); Liqing Liu, Sakai (JP); Taewoo Lee, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/979,491

(22) PCT Filed: Mar. 12, 2019

(86) PCT No.: PCT/JP2019/009915
§ 371 (c)(1),
(2) Date: Sep. 9, 2020

(87) PCT Pub. No.: WO2019/176914
PCT Pub. Date: Sep. 19, 2019

(65) Prior Publication Data
US 2021/0368528 A1 Nov. 25, 2021

(30) Foreign Application Priority Data
Mar. 13, 2018 (JP) .............................. JP2018-045143

(51) Int. Cl.
*H04W 72/04* (2009.01)
*H04W 72/1273* (2023.01)
(Continued)

(52) U.S. Cl.
CPC ....... *H04W 72/1273* (2013.01); *H04L 1/1819* (2013.01); *H04L 1/1896* (2013.01); *H04W 72/1268* (2013.01)

(58) Field of Classification Search
CPC ......... H04W 72/1273; H04W 72/1284; H04W 72/1278; H04W 72/1268; H04W 28/04;
(Continued)

(56) References Cited

U.S. PATENT DOCUMENTS

2014/0036856 A1 2/2014 Hyun

FOREIGN PATENT DOCUMENTS

WO 2014185850 A1 11/2014

OTHER PUBLICATIONS

R1-1803545, Samsung, draftCR to 38.213, 3GPP TSG-RAN1 Meeting #92, Feb. 26-Mar. 1, 2018 (Year: 2018).*
(Continued)

*Primary Examiner* — Mahbubul Bar Chowdhury
(74) *Attorney, Agent, or Firm* — ScienBiziP, P.C.

(57) ABSTRACT

Included are a receiver receiving a PDCCH and a PDSCH scheduled by the PDCCH, and a transmitter transmitting, on a PUCCH, one or multiple HARQ-ACKs including at least a HARQ-ACK corresponding to a TB included in the PDSCH and an SR.

For the HARQ-ACK of two or less bits, a resource of the PUCCH is, from one or multiple PUCCH resources in a PUCCH resource set, based at least on a first value based at least on the number of bits of the one or multiple HARQ-ACKs transmitted in the PUCCH, regardless of the number of resources of the SR overlapping with the PUCCH.

For the HARQ-ACK of more than two bits, the resource of the PUCCH is, from the one or multiple PUCCH resources
(Continued)

in the PUCCH resource set, based at least on a sum of the number of bits of the one or multiple HARQ-ACKs and the SR.

2 Claims, 14 Drawing Sheets

(51) Int. Cl.
    *H04L 1/1812* (2023.01)
    *H04L 1/1867* (2023.01)
    *H04W 72/1268* (2023.01)

(58) Field of Classification Search
    CPC ... H04L 1/1819; H04L 1/1896; H04L 1/1671; H04L 1/1861; H04L 1/1864; H04L 1/1812; H04L 5/0053; H04L 5/0094; H04L 5/0055
    See application file for complete search history.

(56) References Cited

OTHER PUBLICATIONS

R1-1803258, Ericsson, Summary of Contributions on PUCCH structure in short-duration, 3GPP TSG RAN WG1 Meeting #92, Feb. 26-Mar. 2, 2018 (Year: 2018).*

R1-1802510, Panasonic, Discussion on partial overlap between HARQ-ACK and SR, 3GPP TSG RAN WG1 Meeting #92, Feb. 26-Mar. 2, 2018 (Year: 2018).*

R1-1801262, Ericsson, Summary of Discussions on Multiplexing Different UCI types on a PUCCH resource, Jan. 22-26, 2018 (Year: 2018).*

Ericsson, "Partial overlapping of PUCCH resources", R1-1803531, 3GPP TSG RAN WG1 Meeting #92, Athens, Greece, February 26-Mar. 2, 2018.

Sharp, "Remaining issues on UCI multiplexing", R1-1806948, 3GPP TSG RAN WG1 Meeting #93, Busan, Korea, May 21-25, 2018.

Nokia, Nokia Shanghai Bell, "PUCCH Resource Allocation", R1-1720014, 3GPP TSG-RAN WG1 #91, Reno, Nevada, USA, Nov. 27-Dec. 1, 2017.

Ericsson, "On PUCCH Resource Allocation", R1-1721006, 3GPP TSG-RAN WG1 Meeting RAN1#91, Reno, Nevada, United States, Nov. 27-Dec. 1, 2017.

Panasonic, "Discussion on multiplexing of SR and 1 or 2 bits HARQ-ACK", R1-1708090, 3GPP TSG RAN WG1 Meeting #89, Hangzhou, P.R. China, May 15-19, 2017.

Samsung, draftCR to 38.213 capturing the NR ad-hoc 1801 and RAN1#92 meeting agreements[online], 3GPP TSG RAN WG1 #92 R1-1803545, Mar. 9, 2018.

"New SID proposal: Study on New Radio Access Technology," RP-160671, NTT docomoDOCOMO, Inc., 3GPP TSG RAN Meeting #71, Goteborg, Sweden, Mar. 7-10, 2016.

* cited by examiner

Figure A: Table of number of OFDM symbols per slot $N^{symb,\mu}_{slot}$ for subcarrier spacing configuration $\mu$ and normal cyclic prefix

| $\mu$ | slot_configuration | | | | | |
|---|---|---|---|---|---|---|
| | 0 | | | 1 | | |
| | $N^{slot}_{symb}$ | $N^{frame,\mu}_{slot}$ | $N^{subframe,\mu}_{slot}$ | $N^{slot}_{symb}$ | $N^{frame,\mu}_{slot}$ | $N^{subframe,\mu}_{slot}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | - | - | - |
| 4 | 14 | 160 | 16 | - | - | - |
| 5 | 14 | 320 | 32 | - | - | - |

Figure B: Table of number of OFDM symbols per slot $N^{symb,\mu}_{slot}$ for subcarrier spacing configuration $\mu$ and extended cyclic prefix

| $\mu$ | slot_configuration | | | | | |
|---|---|---|---|---|---|---|
| | 0 | | | 1 | | |
| | $N^{slot}_{symb}$ | $N^{frame,\mu}_{slot}$ | $N^{subframe,\mu}_{slot}$ | $N^{slot}_{symb}$ | $N^{frame,\mu}_{slot}$ | $N^{subframe,\mu}_{slot}$ |
| 2 | 12 | 40 | 4 | 6 | 80 | 8 |

FIG. 2

| PUCCH format | Length in OFDM symbols $N^{PUCCH}_{symb}$ | $N_{UCI0}$ |
| --- | --- | --- |
| 0 | 1 - 2 | $\leq 2$ |
| 1 | 4 - 14 | $\leq 2$ |
| 2 | 1 - 2 | $> 2$ |
| 3 | 4 - 14 | $> 2$ |
| 4 | 4 - 14 | $> 2$ |

FIG. 4

TERMINAL APPARATUS, BASE STATION APPARATUS, AND COMMUNICATION METHOD FOR PUCCH RESOURCE SELECTION

TECHNICAL FIELD

The present invention relates to a terminal apparatus, a base station apparatus, and a communication method.

This application claims the benefit of priority to Japanese Patent Application No. 2018-045143 filed on Mar. 13, 2018, which is incorporated herein by reference in its entirety.

BACKGROUND ART

A wireless access scheme and a wireless network of cellular mobile communication (hereinafter, referred to as "Long Term Evolution (LTE)" or "Evolved Universal Terrestrial Radio Access (EUTRA)") have been studied in the 3rd Generation Partnership Project (3GPP). In LTE, a base station apparatus is also referred to as an evolved NodeB (eNodeB), and a terminal apparatus is also referred to as user equipment (UE). LTE is a cellular communication system in which a plurality of areas are deployed in a cell structure, with each of the plurality of areas being covered by a base station apparatus. A single base station apparatus may manage a plurality of serving cells.

3GPP has been studying a next generation standard (New Radio (NR)) (NPL 1) to make a proposal for International Mobile Telecommunication (IMT)-2020, a standard for a next-generation mobile communication system, standardized by the International Telecommunication Union (ITU). NR is required to satisfy requirements on the assumption of three scenarios including enhanced Mobile BroadBand (eMBB), massive Machine Type Communication (mMTC), and Ultra Reliable and Low Latency Communication (URLLC) in a single technology framework.

CITATION LIST

Non Patent Literature

NPL 1: "New SID proposal: Study on New Radio Access Technology," RP-160671, NTT DOCOMO, INC., 3GPP TSG RAN Meeting #71, Goteborg, Sweden, 7 to 10 Mar. 2016.

SUMMARY OF INVENTION

Technical Problem

One aspect of the present invention provides a terminal apparatus capable of efficiently performing communication, a communication method used in the terminal apparatus, a base station apparatus capable of efficiently performing communication, and a communication method used in the base station apparatus.

Solution to Problem (1) A first aspect of the present invention provides a terminal apparatus including: a receiver configured to receive a Physical Downlink Control Channel (PDCCH) and receive a Physical Downlink Shared Channel (PDSCH) scheduled by the PDCCH; and a transmitter configured to transmit, on a Physical Uplink Control Channel (PUCCH), one or a plurality of Hybrid Automatic Repeat Request Acknowledgements (HARQ-ACKs) and a Scheduling Request (SR), wherein the plurality of HARQ-ACKs includes at least a HARQ-ACK corresponding to a transport block included in the PDSCH, in which, in a case that the number of bits of the HARQ-ACK is equal to or less than two, a resource of the PUCCH is provided based at least on a first value from one or a plurality of PUCCH resources included in a certain PUCCH resource set, the first value is provided based at least on the number of bits of the one or plurality of HARQ-ACKs included and transmitted in the PUCCH, regardless of the number of resources of the SR that overlap with the PUCCH, and in a case that the number of bits of the HARQ-ACK exceeds two, the resource of the PUCCH is provided based at least on a sum of the number of the bits of the one or plurality of HARQ-ACKs and the number of bits of the SR from the one or plurality of PUCCH resources included in the certain PUCCH resource set.

(2) A second aspect of the present invention provides a base station apparatus including: a transmitter configured to transmit a Physical Downlink Control Channel (PDCCH) and transmit a Physical Downlink Shared Channel (PDSCH) scheduled by the PDCCH; and a receiver configured to receive, on a Physical Uplink Control Channel (PUCCH), one or a plurality of Hybrid Automatic Repeat Request Acknowledgements (HARQ-ACKs) and a Scheduling Request (SR), wherein the plurality of HARQ-ACKs includes at least a HARQ-ACK corresponding to a transport block included in the PDSCH, in which, in a case that the number of bits of the HARQ-ACK is equal to or less than two, a resource of the PUCCH is provided based at least on a first value from one or a plurality of PUCCH resources included in a certain PUCCH resource set, the first value is provided based at least on the number of bits of the one or plurality of HARQ-ACKs included and transmitted in the PUCCH, regardless of the number of resources of the SR that overlap with the PUCCH, and in a case that the number of bits of the HARQ-ACK exceeds two, the resource of the PUCCH is provided based at least on a sum of the number of the bits of the one or plurality of HARQ-ACKs and the number of bits of the SR from the one or plurality of PUCCH resources included in the certain PUCCH resource set.

(3) A third aspect of the present invention provides a communication method used by a terminal apparatus including: receiving a Physical Downlink Control Channel (PDCCH) and receiving a Physical Downlink Shared Channel (PDSCH) scheduled by the PDCCH; and transmitting, on a Physical Uplink Control Channel (PUCCH), one or a plurality of Hybrid Automatic Repeat Request Acknowledgements (HARQ-ACKs) and a Scheduling Request (SR), wherein the plurality of HARQ-ACKs includes at least a HARQ-ACK corresponding to a transport block included in the PDSCH, in which, in a case that the number of bits of the HARQ-ACK is equal to or less than two, a resource of the PUCCH is provided based at least on a first value from one or a plurality of PUCCH resources included in a certain PUCCH resource set, the first value is provided based at least on the number of bits of the one or plurality of HARQ-ACKs included and transmitted in the PUCCH, regardless of the number of resources of the SR that overlap with the PUCCH, and in a case that the number of bits of the HARQ-ACK exceeds two, the resource of the PUCCH is provided based at least on a sum of the number of the bits of the one or plurality of HARQ-ACKs and the number of bits of the SR from the one or plurality of PUCCH resources included in the certain PUCCH resource set.

(4) A fourth aspect of the present invention provides a communication method used by a base station apparatus including: transmitting a Physical Downlink Control Channel (PDCCH) and transmitting a Physical Downlink Shared Channel (PDSCH) scheduled by the PDCCH; and receiving, on a Physical Uplink Control Channel (PUCCH), one or a plurality of Hybrid Automatic Repeat Request Acknowledgements (HARQ-ACKs) and a Scheduling Request (SR), wherein the plurality of HARQ-ACKs includes at least a HARQ-ACK corresponding to a transport block included in the PDSCH, in which, in a case that the number of bits of the HARQ-ACK is equal to or less than two, a resource of the PUCCH is provided based at least on a first value from one or a plurality of PUCCH resources included in a certain PUCCH resource set, the first value is provided based at least on the number of bits of the one or plurality of HARQ-ACKs included and transmitted in the PUCCH, regardless of the number of resources of the SR that overlap with the PUCCH, and in a case that the number of bits of the HARQ-ACK exceeds two, the resource of the PUCCH is provided based at least on a sum of the number of the bits of the one or plurality of HARQ-ACKs and the number of bits of the SR from the one or plurality of PUCCH resources included in the certain PUCCH resource set.

Advantageous Effects of Invention

According to one aspect of the present invention, the terminal apparatus can efficiently perform communication. In addition, the base station apparatus can efficiently perform communication.

BRIEF DESCRIPTION OF DRAWINGS

FIG. 2 is an example illustrating a relationship of Nslot-symb, a subcarrier spacing configuration μ, a slot configuration, and a CP configuration according to an aspect of the present embodiment.

FIG. 4 is a diagram illustrating an example of a relationship of PUCCH formats and a lengths NPUCCHsymb and NUCI0 of the PUCCH formats according to an aspect of the present embodiment.

DESCRIPTION OF EMBODIMENTS

Embodiments of the present invention will be described below.

Figure 1:
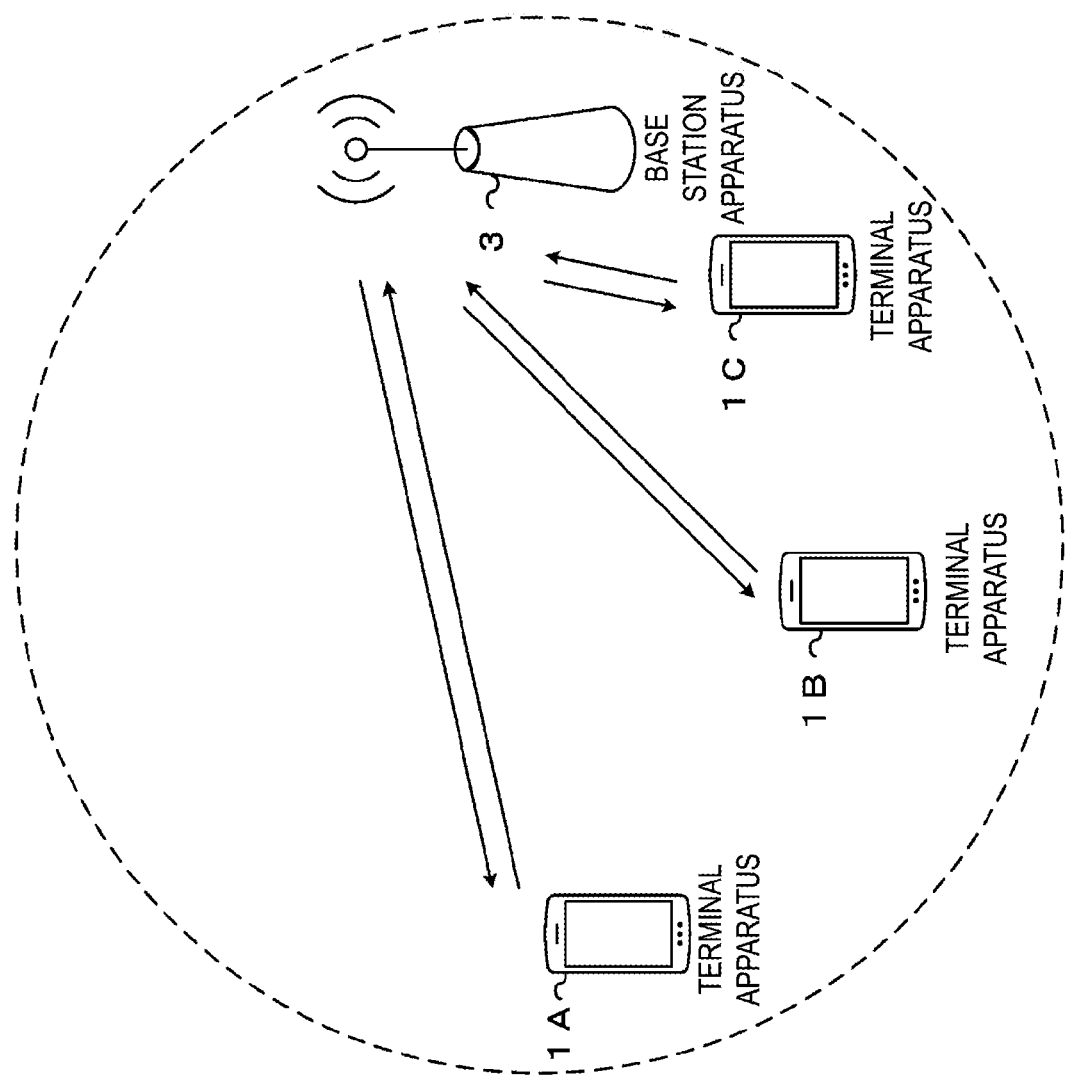
FIG. 1 is a conceptual diagram of a radio communication system according to an aspect of the present embodiment.

FIG. 1 is a conceptual diagram of a radio communication system according to an aspect of the present embodiment. In FIG. 1, the radio communication system includes terminal apparatuses 1A to 1C and a base station apparatus 3. Hereinafter, each the terminal apparatuses 1A to 1C will also be referred to as a terminal apparatus 1.

Hereinafter, a frame configuration will be described.

In the radio communication system according to an aspect of the present embodiment, at least orthogonal frequency division multiplexing (OFDM) is used. The OFDM symbol is a unit of a time domain of the OFDM. The OFDM symbol includes at least one or a plurality of subcarriers. The OFDM symbol is converted into a time-continuous signal in generation of a baseband signal.

A subcarrier spacing (SCS) may be given by an equation of a subcarrier spacing $\Delta f = 2\mu \cdot 15$ kHz. For example, a subcarrier spacing configuration μ may be configured as any of 0, 1, 2, 3, 4, and/or 5. For a carrier bandwidth part (CBP), the subcarrier spacing configuration μ may be provided by a parameter of a higher layer.

In the radio communication system according to an aspect of the present embodiment, a time unit $T_c$ is used for expressing a length in the time domain. The time unit $T_c$ may be given by an equation of $T_c = 1/(\Delta f_{max} \cdot N_f)$. $\Delta f_{max}$ may be the maximum value of the subcarrier spacing supported by the radio communication system according to an aspect of the present embodiment. As for $\Delta f_{max}$, $\Delta f_{max} = 480$ kHz may be satisfied. As for $N_f$, $N_f = 4096$ may be satisfied. As for constant κ, $\kappa = \Delta f_{max} \cdot N_f/(\Delta f_{ref} N_{f,ref}) = 64$. $\Delta f_{ref}$ may be 15 kHz. $N_{f,ref}$ may be 2048.

The constant κ may be a value indicating a relationship between a reference subcarrier spacing and $T_c$. The constant κ may be used for the length of a subframe. The number of slots included in the subframe may be provided based at least on the constant κ. $\Delta f_{ref}$ is a reference subcarrier spacing, and $N_{f,ref}$ is a value corresponding to the reference subcarrier spacing.

Downlink transmission and/or uplink transmission includes 10 ms frames. A frame is configured to include 10 subframes. The length of the subframe is 1 ms. The length of the frame may be provided regardless of the subcarrier spacing Δf. In other words, the frame configuration may be provided regardless of μ. The length of the subframe may be provided regardless of the subcarrier spacing Δf. In other words, the subframe configuration may be provided regardless of μ.

For a certain subcarrier spacing configuration μ, the number and indexes of slots included in a subframe may be provided. For example, a first slot number $n^\mu_s$ may be given in ascending order ranging from 0 to $N^{subframe,\mu}_{slot}-1$ within a subframe. For the subcarrier spacing configuration μ, the number and indexes of slots included in a frame may be provided. For example, a second slot number $n^\mu_{s,f}$ may be provided in ascending order ranging from 0 to $N^{frame,\mu}_{slot}-1$ within a frame. $N^{slot}_{symb}$ consecutive OFDM symbols may be included in one slot. $N^{slot}_{symb}$ may be provided based at least one of or both a slot configuration and/or a cyclic prefix (CP) configuration. The slot configuration may be provided by a parameter slot_configuration of a higher layer. The CP configuration may be provided based at least on a parameter of a higher layer. The CP configuration may be provided based at least on dedicated radio resource control (RRC) signaling. Each of the first slot number and the second slot number is also referred to as a slot number (slot index).

FIG. 2 is an example illustrating a relationship of $N^{slot}_{symb}$, the subcarrier spacing configuration μ, the slot configuration, and the CP configuration according to an aspect of the present embodiment. In a case that the slot configuration is zero, the subcarrier spacing configuration is two, and the CP configuration is a normal cyclic prefix (normal CP) in FIG. 2A, $N^{slot}_{symb}=14$, $N^{frame,\mu}_{slot}=40$, and $N^{subframe,\mu}_{slot}=4$. In addition, in a case that the slot configuration is zero, the subcarrier spacing configuration is two, and the CP configuration is an extended cyclic prefix (extended CP) in FIG. 2B, $N^{slot}_{symb}=12$, $N^{frame,\mu}_{symb}=40$, and $N^{subframe,\mu}_{slot}=4$. $N^{slot}_{symb}$ in the slot configuration 0 may correspond to twice $N^{slot}_{symb}$ in the slot configuration 1.

Physical resources will be described below.

An antenna port is defined in such a manner that a channel at one antenna port through which symbols are conveyed can be estimated from a channel at the same antenna port through which other symbols are conveyed. In a case that a large scale property of the channel at one antenna port through which symbols are conveyed can be estimated from a channel at another antenna port through which symbols are conveyed, the two antenna ports are said to be quasi colocated (QCL). The large scale property may include at least long term performance of the channel. The large scale property includes at least some or all of delay spread, Doppler spread, Doppler shift, an average gain, an average delay, and spatial Rx parameters. A first antenna port and a second antenna port being QCL with respect to a beam parameter may mean that a reception beam assumed by the reception side for the first antenna port is the same as a reception beam assumed by the reception side for the second antenna port. The first antenna port and the second antenna port being QCL with respect to a beam parameter may mean that a transmission beam assumed by the reception side for the first antenna port is the same as a transmission beam assumed by the reception side for the second antenna port. In a case that the large scale property of a channel at one antenna port through which symbols are conveyed can be estimated from a channel at another antenna port through which symbols are conveyed in the terminal apparatus 1, the two antenna port may be assumed to be QCL. The two antenna ports being QCL may mean that the two antenna ports are assumed to be QCL.

For each of the subcarrier spacing configuration and a carrier set, a resource grid including $N^{\mu}_{RB,x} N^{RB}_{sc}$ subcarriers and $N^{(\mu)}_{symb} N^{subframe,\mu}_{symb}$ OFDM symbols is provided. $N^{\mu}_{RB,x}$ may indicate the number of resource blocks provided for the subcarrier spacing configuration μ for a carrier x. $N^{\mu}_{RB,x}$ may indicate the maximum number of resource blocks provided for the subcarrier spacing configuration μ for the carrier x. The carrier x indicates either a downlink (DL) carrier or an uplink carrier (UL). In other words, x is "DL" or "UL." $N^{\mu}_{RB}$ is a designation that includes $N^{\mu}_{RB,DL}$ and/or $N^{\mu}_{RB,UL}$. $N^{RB}_{sc}$ may indicate the number of subcarriers included in one resource block. At least one resource grid may be provided for each antenna port p and/or for each subcarrier spacing configuration μ and/or for each transmission direction configuration. The transmission direction includes at least downlink (DL) and uplink (UL). Hereinafter, a set of parameters including at least some or all of the antenna port p, the subcarrier spacing configuration μ, and the transmission direction configuration will also be referred to as a first radio parameter set. In other words, one resource grid may be provided for each first radio parameter set.

A carrier included in a serving cell in downlink will be referred to as a downlink carrier (or a downlink component carrier). A carrier included in a serving cell in uplink is referred to as an uplink carrier (or an uplink component carrier). The downlink component carrier and the uplink component carrier will collectively be referred to as component carriers.

Each element in the resource grid provided for each first radio parameter set will be referred to as a resource element. The resource element is identified by an index $k_{sc}$ of the frequency domain and an index $l_{sym}$ of the time domain. For a certain first radio parameter set, a resource element is identified by an index $k_{sc}$ of the frequency domain and an index $l_{sym}$ of the time domain. The resource element identified by the index $k_{sc}$ of the frequency domain and the index $l_{sym}$ of the time domain will also be referred to as a resource element $(k_{sc}, l_{sym})$. The index $k_{sc}$ of the frequency domain indicates any of values from 0 to $N^{\mu}_{RB} N^{RB}_{sc}-1$. $N^{\mu}_{RB}$ may be the number of resource blocks provided for the subcarrier spacing configuration μ. $N^{RB}_{sc}$ is the number of subcarriers included in a resource block, and $N^{RB}_{sc}=12$. The index $k_{sc}$ of the frequency domain may correspond to a subcarrier index $k_{sc}$. The index $l_{sym}$ of the time domain may correspond to an OFDM symbol index $l_{sym}$.

Figure 3:
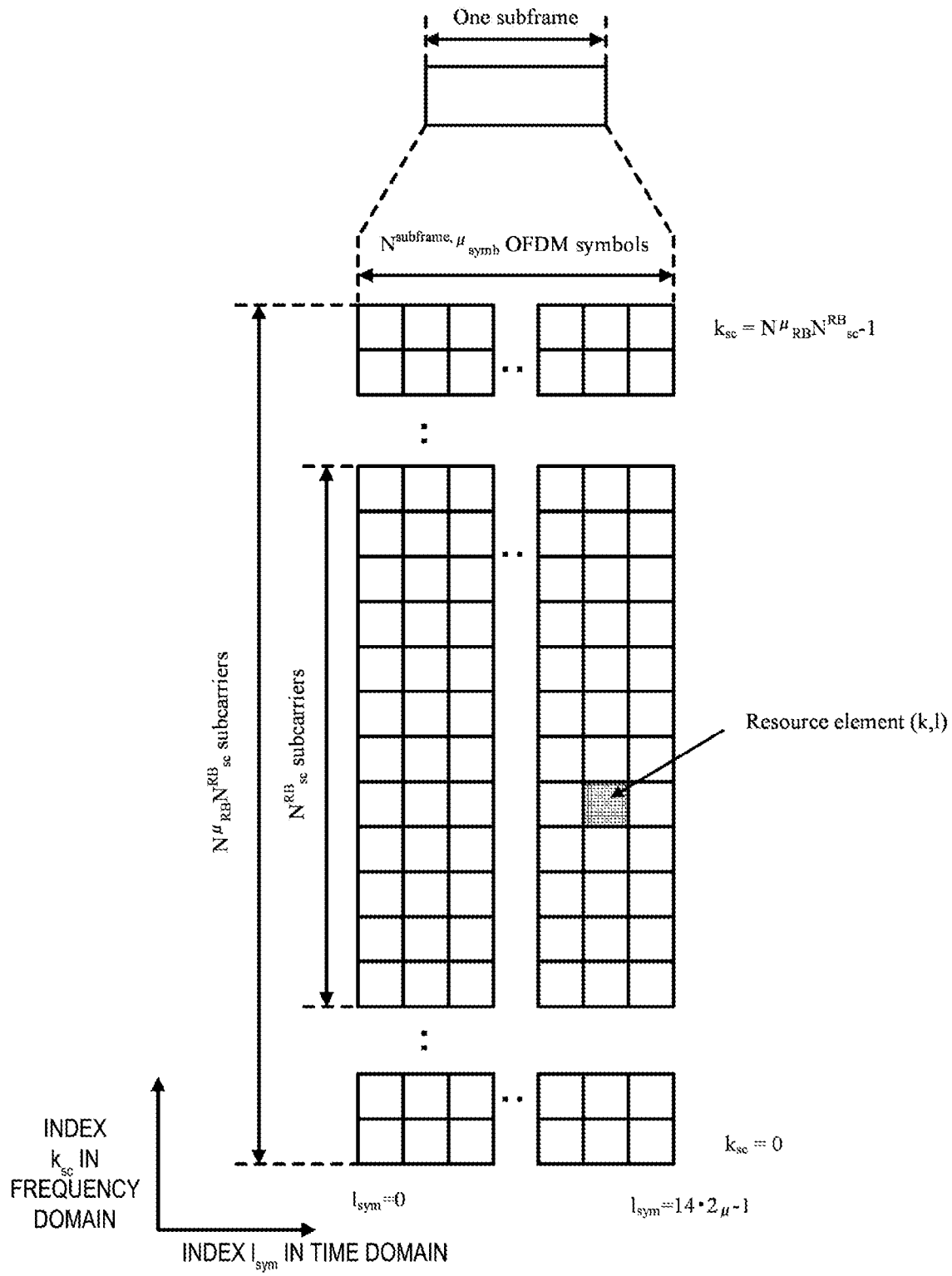
FIG. 3 is a schematic diagram illustrating an example of a resource grid in a subframe according to an aspect of the present embodiment.

FIG. 3 is a schematic diagram illustrating an example of a resource grid in a subframe according to an aspect of the present embodiment. In the resource grid of FIG. 3, the horizontal axis represents the index $l_{sym}$ of the time domain while the vertical axis is the index $k_{sc}$ of the frequency domain. In one subframe, the frequency domain of the resource grid includes $N^{\mu}_{RB} N^{RB}_{sc}$ subcarriers. In one subframe, the time domain of the resource grid may include 14·2μ OFDM symbols. One resource block is configured to include $N^{RB}_{sc}$ subcarriers. The time domain of the resource block may correspond to one OFDM symbol. The time domain of the resource block may correspond to fourteen OFDM symbols. The time domain of the resource block may correspond to one or a plurality of slots. The time domain of the resource block may correspond to one subframe.

The terminal apparatus 1 may receive indication to perform transmission/reception using only a subset of resource grids. The subset of the resource grid is also referred to as a carrier bandwidth part, and the carrier bandwidth part may be provided based at least on a parameter of a higher layer and/or a part or an entire of downlink control information (DCI). The carrier bandwidth part is also referred to as a bandwidth part (BWP). In other words, the terminal apparatus 1 may not receive indication to perform transmission/reception using all sets of resource grids. In other words, the terminal apparatus 1 may receive indication to perform transmission/reception using some frequency resources within the resource grids. One carrier bandwidth part may include a plurality of resource blocks in the frequency domain. One carrier bandwidth part may include a plurality of consecutive resource blocks in the frequency domain. A carrier bandwidth part is also referred to as a bandwidth part (BWP). A carrier bandwidth part configured for a downlink carrier is also referred to as a downlink carrier bandwidth part. A carrier bandwidth part configured for an uplink carrier is also referred to as an uplink carrier bandwidth part.

A set of downlink carrier bandwidth parts may be configured for each serving cell. The set of downlink carrier bandwidth parts may include one or a plurality of downlink carrier bandwidth parts. A set of uplink carrier bandwidth parts may be configured for each serving cell. The set of uplink carrier bandwidth parts may include one or a plurality of uplink carrier bandwidth parts.

The parameter of the higher layer is a parameter included in a signal of a higher layer. The signal of the higher layer may be RRC signaling or a medium access control (MAC) control element (CE). Here, the signal of the higher layer may be a signal of the RRC layer or a signal of the MAC layer.

The signal of the higher layer may be common RRC signaling. The common RRC signaling may include at least some or all of the following features C1 to C3.

Feature C1) Mapped to a broadcast control channel (BCCH) logical channel or to a common control channel (CCCH) logical channel.

Feature C2) Including at least radioResourceConfigCommon information element.

Feature C3) Mapped to a Physical Broadcast CHannel (PBCH).

The radioResourceConfigCommon information element may include information indicating a configuration commonly used in a serving cell. The configuration commonly used in the serving cell may include at least a Physical Random Access Channel (PRACH) configuration. The PRACH configuration may indicate at least one or a plurality of random access preamble indexes. The PRACH configuration may indicate at least time/frequency resources of the PRACH.

The higher layer signaling may be dedicated RRC signaling. The dedicated RRC signaling may include at least some or all of the following features D1) and D2.

Feature D1) Mapped to a dedicated control channel (DCCH) logical channel.

Feature D2) Including at least a radioResourceConfigDedicated information element.

The radioResourceConfigDedicated information element may include at least information indicating a configuration specific to the terminal apparatus 1. The radioResourceConfigDedicated information element may include at least information indicating a configuration of a carrier bandwidth part. The configuration of the carrier bandwidth part may indicate at least a frequency resource of the carrier bandwidth part.

For example, a master information block (MIB), first system information, and second system information may be included in the common RRC signaling. In addition, a message of a higher layer that is mapped to the DCCH logical channel and includes at least radioResourceConfigCommon may be included in the common RRC signaling. In addition, a message of a higher layer that is mapped to the DCCH logical channel and does not include the radioResourceConfigCommon information element may be included in the dedicated RRC signaling. In addition, a message of a higher layer message that is mapped to the DCCH logical channel and includes at least the radioResourceConfigDedicated information element may be included in the dedicated RRC signaling.

The first system information may include at least a time index of a synchronization signal (SS) block. The SS block is also referred to as an SS/PBCH block. The first system information may include at least information related to a PRACH resource. The first system information may include at least information related to a configuration of initial connection. The second system information may be system information other than the first system information.

The radioResourceConfigDedicated information element may include at least information related to the PRACH resource. The radioResourceConfigDedicated information element may include at least information related to the configuration of initial connection.

Hereinafter, physical channels and physical signals according to various aspects of the present embodiment will be described.

An uplink physical channel may correspond to a set of resource elements that convey information generated in a higher layer. The uplink physical channel is a physical channel used in the uplink carrier. In the radio communication system according to an aspect of the present embodiment, at least some or all of the uplink physical channels described below are used.

PUCCH

Physical Uplink Shared Channel (PUSCH)

PRACH

The PUCCH may be used to transmit uplink control information (UCI). The uplink control information includes some or all of channel state information (CSI), an SR, and a HARQ-ACK corresponding to a transport block, TB (a MAC protocol data unit (PDU), a downlink-shared channel (DL-SCH), a PDSCH).

The HARQ-ACK may include at least a HARQ-ACK bit corresponding to at least one transport block. The HARQ-ACK bit may indicate an acknowledgement (ACK) or a negative-acknowledgement (NACK) corresponding to one or a plurality of transport blocks. The HARQ-ACK may include at least a HARQ-ACK codebook including one or a plurality of HARQ-ACK bits. The HARQ-ACK bit corresponding to one or a plurality of transport blocks may mean that the HARQ-ACK bit corresponds to the PDSCH including one or a plurality of transport blocks.

The HARQ-ACK bit may indicate an ACK or a NACK corresponding to one code block group (CBG) included in a transport block. The HARQ-ACK is also referred to as HARQ feedback, HARQ information, or HARQ control information.

An SR may be used at least to request a PUSCH resource for initial transmission. A scheduling request bit may be used to indicate either a positive SR or a negative SR. The scheduling request bit indicating a positive SR will also be referred to as "a positive SR being transmitted". The positive SR may indicate that a PUSCH resource for initial transmission is requested by the terminal apparatus 1. The positive SR may indicate that a scheduling request is triggered by a higher layer. The positive SR may be transmitted in a case that the higher layer indicates that a scheduling request is to be transmitted. The scheduling request bit indicating a negative SR will also be referred to as "a negative SR being transmitted". The negative SR may indicate that the PUSCH resource for initial transmission is not requested by the terminal apparatus 1. The negative SR may indicate that the scheduling request is not triggered by the higher layer. The negative SR may be transmitted in a case that the higher layer does not indicate that the scheduling request is to be transmitted.

The scheduling request bit may be used to indicate either a positive SR or a negative SR for one SR configuration or some of a plurality of SR configurations. Each of the one or plurality of SR configurations may correspond to one or a plurality of logical channels. A positive SR for a certain SR configuration may be a positive SR for the one logical channel or some or all of the plurality of logical channels corresponding to the certain SR configuration. The negative SR may not correspond to a specific SR configuration. The negative SR being indicated may mean that the negative SR is indicated for all of the SR configurations.

The SR configurations may be scheduling request IDs.

The channel state information may include at least some or all of a channel quality indicator (CQI), a precoder matrix indicator (PMI), and a rank indicator (RI). The CQI is an indicator related to channel quality (propagation strength, for example) while the PMI is an indicator indicating a precoder. The RI is an indicator indicating a transmission rank (or the number of transmission layers).

The PUCCH supports PUCCH formats (a PUCCH format 0 to a PUCCH format 4). The PUCCH formats may be mapped to the PUCCH and transmitted. The PUCCH formats may be transmitted on the PUCCH. The PUCCH formats being transmitted may mean the PUCCH being transmitted.

FIG. 4 is a diagram illustrating an example of a relationship of PUCCH formats and a lengths $N^{PUCCH}_{symb}$ and $N_{UCI0}$ of the PUCCH formats according to an aspect of the present embodiment. The length $N^{PUCCH}_{symb}$ of the PUCCH format 0 is 1 or 2 OFDM symbols, and the value of $N_{UCI0}$ related to the PUCCH format 0 is equal to or less than 2. The length $N^{PUCCH}_{symb}$ of the PUCCH format 1 is 4 to 14 OFDM symbols, and the value of $N_{UCI0}$ related to the PUCCH format 1 is equal to or less than 2. The length $N^{PUCCH}_{symb}$ of the PUCCH format 2 is 1 or 2 OFDM symbols, and the value of $N_{UCI0}$ related to the PUCCH format 2 is greater than 2. The length $N^{PUCCH}_{symb}$ of the PUCCH format 3 is 4 to 14 OFDM symbols, and the value of $N_{UCI0}$ related to the PUCCH format 3 is greater than 2. The length $N^{PUCCH}_{symb}$ of the PUCCH format 4 is 4 to 14 OFDM symbols, and the value of $N_{UCI0}$ related to the PUCCH format 4 is greater than 2. $N_{UCI0}$ may be provided based at least on $O_{ACK}$ transmitted in the PUCCH formats. $N_{UCI0}$ may be provided regardless of the number of bits of the scheduling request $O_{SR}$.

The PUSCH is used at least to transmit a TB (MAC PDU, UL-SCH, PUSCH). The PUSCH may be used at least to transmit some or all of the transport block, the HARQ-ACK, the channel state information, and the scheduling request. The PUSCH is used at least to transmit a random access message 3.

The PRACH may be used at least to transmit a random access preamble (random access message 1). The PRACH may be used at least to indicate some or all of an initial connection establishment procedure, a handover procedure, a connection re-establishment procedure, synchronization with PUSCH transmission (timing adjustment) and a request for resources for the PUSCH. The random access preamble may be used to notify the base station apparatus 3 of an index (random access preamble index) provided by a higher layer of the terminal apparatus 1.

The random access preamble may be provided by a Zadoff-Chu sequence corresponding to a physical root sequence index u being cyclic-shifted. The Zadoff-Chu sequence may be generated based on the physical root sequence index u. In one serving cell, a plurality of random access preambles may be defined. A random access preamble may be identified based at least on an index of the random access preamble. A different random access preamble corresponding to a different index of the random access preamble may correspond to a different combination of the physical root sequence index u and the cyclic shift. The physical root sequence index u and the cyclic shift may be provided based at least on information included in system information. The physical root sequence index u may be an index for identifying a sequence included in the random access preamble. The random access preamble may be specified based at least on the physical root sequence index u.

In FIG. 1, the following uplink physical signals are used for uplink radio communication. The uplink physical signals may not be used to transmit information output from a higher layer but are used by a physical layer.

Uplink Demodulation Reference Signal (UL DMRS)

Sounding Reference Signal (SRS)

Uplink Phase Tracking Reference Signal (UL PTRS)

The UL DMRS is related to transmission of the PUSCH and/or the PUCCH. The UL DMRS is multiplexed with the PUSCH or the PUCCH. The base station apparatus 3 may use the UL DMRS in order to perform channel compensation of the PUSCH or the PUCCH. Hereinafter, transmission of both the PUSCH and the UL DMRS related to the PUSCH will simply be referred to as transmission of the PUSCH. Hereinafter, transmission of both a PUCCH and a UL DMRS associated with the PUCCH will simply be referred to as transmission of the PUCCH. The UL DMRS related to the PUSCH will also be referred to as a UL DMRS for the PUSCH. The UL DMRS related to the PUCCH will also be referred to as a UL DMRS for the PUCCH.

SRS may not be related to transmission of the PUSCH or the PUCCH. The base station apparatus 3 may use the SRS for measuring a channel state. The SRS may be transmitted at the end of a subframe in an uplink slot or in an OFDM symbol in an order of a prescribed number from the end.

The UL PTRS may be a reference signal that is used at least for phase tracking. The UL PTRS may be related to a UL DMRS group including at least an antenna port used for one or a plurality of UL DMRSs. The UL PTRS and the UL DMRS group being related to each other may mean that the antenna port of the UL PTRS and at least some or all of the antenna ports included in the UL DMRS group are QCL. The UL DMRS group may be identified based at least on the antenna port of the smallest index for the UL DMRS included in the UL DMRS group. The UL PTRS may be mapped to the antenna port of the smallest index in one or a plurality of antenna ports to which one codeword is mapped. In a case that one codeword is mapped at least to a first layer and a second layer, the UL PTRS may be mapped to the first layer. The UL PTRS may not be mapped to the second layer. The index of the antenna port to which the UL PTRS is mapped may be provided based at least on downlink control information.

In FIG. 1, the following downlink physical channels are used for downlink radio communication from the base station apparatus 3 to the terminal apparatus 1. The downlink physical channels are used by the physical layer for transmission of information output from a higher layer.

PBCH

PDCCH

PDSCH

The PBCH is used at least to transmit an MIB or a broadcast channel (BCH). The PBCH may be transmitted based on a prescribed transmission interval. The PBCH may be transmitted at an interval of 80 ms. The PBCH may be transmitted at an interval of 160 ms. Contents of information included in the PBCH may be updated at every 80 ms. Apart or an entirety of information included in the PBCH may be updated at every 160 ms. The PBCH may include 288 subcarriers. The PBCH may include 2, 3, or 4 OFDM symbols. The MIB may include information related to an identifier (index) of a synchronization signal. The MIB may include information indicating at least some of the numbers of the slot, the subframe, and/or the radio frame through which the PBCH is transmitted.

The PDCCH is used at least to transmit DCI. The PDCCH including at least the downlink control information may be transmitted. The PDCCH may include the downlink control information. The downlink control information is also referred to as a DCI format. The downlink control information may include at least either a downlink grant or an uplink grant. The DCI format used to schedule the PDSCH is also referred to as a downlink DCI format. The DCI format used to schedule the PUSCH is also referred to as an uplink DCI format. The downlink grant is also referred to as downlink assignment or downlink allocation. The uplink DCI format includes at least one of or both a first uplink DCI format and a second uplink DCI format.

The first uplink DCI format is configured to include at least some or all of 1A to 1H.

1A) Identifier for DCI formats field
1B) Frequency domain resource assignment field
1C) Time domain resource assignment field
1D) Frequency hopping flag field
1E) Modulation and coding scheme (MCS) field
1F) First CSI request field
1G) PDSCH-to-HARQ feedback timing indicator field
1H) PUCCH resource indicator field The identifier for the DCI formats field may be used at least to indicate which of one or a plurality of DCI formats the DCI format including the identifier for the DCI formats fields corresponds to. The one or the plurality of DCI formats may be provided based at least on some or all of the downlink DCI format, the first uplink DCI format, and/or the second DCI format. The one or the plurality of DCI formats may include at least some or all of the downlink DCI format, the first uplink DCI format, and/or the second DCI format.

The frequency domain resource assignment field may be used at least to indicate allocation of frequency resources for the PUSCH scheduled in the DCI format including the frequency domain resource allocation field.

The time domain resource assignment field may be used at least to indicate allocation of time resources for the PUSCH scheduled in the DCI format including the time domain resource allocation field.

The frequency hopping flag field may be used at least to indicate whether or not frequency hopping is to be applied to the PUSCH scheduled in the DCI format including the frequency hopping flag field.

The MCS field may be used at least to indicate some or all of a modulation scheme and/or a target coding rate for the PUSCH scheduled in the DCI format including the MCS field. The target coding rate may be a target coding rate for a transport block of the PUSCH. The TB size (TBS) may be provided based at least on the target coding rate.

The first CSI request field is used at least to indicate a CSI report. The size of the first CSI request field may be a prescribed value. The size of the first CSI request field may be 0, 1, 2, or 3.

The PDSCH-to-HARQ feedback timing indicator field may be a field indicating a timing K1. In a case that an index of a slot including the last OFDM symbol of the PDSCH is a slot n, an index of the slot including the PUCCH or the PUSCH including at least a HARQ-ACK corresponding to a transport block included in the PDSCH may be n+K1. In a case that the index of the slot including the last OFDM symbol of the PDSCH is the slot n, the index of the slot including the first OFDM symbol of the PUCCH including at least the HARQ-ACK corresponding to the transport block included in the PDSCH or the first OFDM symbol of the PUSCH may be n+K1.

The PUCCH resource indicator field may be a field indicating an index or indexes of one or a plurality of PUCCH resources included in a PUCCH resource set.

The second uplink DCI format is configured to include at least some or all of 2A to 2H.

2A) Identifier for DCI formats field
2B) Frequency domain resource assignment field
2C) Time domain resource assignment field
2D) Frequency hopping flag field
2E) MCS field
2F) Second CSI request field
2G) PDSCH-to-HARQ feedback timing indicator field
2H) PUCCH resource indicator field The second CSI request field is used at least to indicate a CSI report. The size of the second CSI request field may be provided based at least on a parameter ReportTriggerSize of a higher layer.

In various aspects of the present embodiment, the number of resource blocks indicates the number of resource blocks in the frequency domain unless otherwise particularly indicated.

The downlink grant is used at least for scheduling one PDSCH in one serving cell.

The uplink grant is used at least for scheduling one PUSCH in one serving cell.

One physical channel may be mapped to one serving cell. One physical channel is mapped to one carrier bandwidth part configured for one carrier included in one serving cell.

In the terminal apparatus 1, one or a plurality of control resource sets (CORESETs) may be configured. The terminal apparatus 1 monitors the PDCCH in one or a plurality of control resource sets (monitor).

The control resource set may indicate a time-frequency domain to which one or a plurality of PDCCHs can be mapped. The control resource set may be a domain in which the terminal apparatus 1 monitors the PDCCH. The control resource set may include consecutive resources (localized resources). The control resource set may include non-consecutive resources (distributed resources).

In the frequency domain, a unit of mapping the control resource set may be resource blocks. In the frequency domain, for example, the unit of mapping the control resource set may be six resource blocks. In the time domain, the unit of mapping the control resource set may be OFDM symbols. In the time domain, for example, the unit of mapping the control resource set may be one OFDM symbol.

The frequency domain of the control resource set may be provided based at least on higher layer signaling and/or downlink control information.

The time domain of the control resource set may be provided based at least on higher layer signaling and/or downlink control information.

A certain control resource set may be a common control resource set. The common control resource set may be a control resource set configured commonly for a plurality of terminal apparatuses 1. The common control resource set may be provided based at least on some or all of an MIB, first system information, second system information, common RRC signaling, and a cell ID. For example, the time resource and/or the frequency resource of the control resource set configured to monitor the PDCCH to be used for scheduling of the first system information may be provided based at least on the MIB.

A certain control resource set may be a dedicated control resource set. The dedicated control resource set may be a control resource set configured to be used dedicatedly for the terminal apparatus 1. The dedicated control resource set may be provided based at least on some or all of dedicated RRC signaling and a cell-radio network temporary identifier (C-RNTI) value.

The set of PDCCH candidates monitored by the terminal apparatus 1 may be defined from a viewpoint of a search space. In other words, the set of PDCCH candidates monitored by the terminal apparatus 1 may be provided by the search space.

The search space may be configured to include one or a plurality of PDCCH candidates of one or a plurality of aggregation levels. The aggregation level of the PDCCH candidate may indicate the number of CCEs constituting the PDCCH.

The terminal apparatus 1 may monitor at least one or a plurality of search spaces in a slot for which no discontinuous reception (DRX) is configured. DRX may be provided based at least on a parameter of a higher layer. The terminal apparatus 1 may monitor at least one or a plurality of search space sets in a slot for which no DRX is configured.

A search space set may be configured to include at least one or a plurality of search spaces. The search space set may include at least some or all of a type-0 PDCCH common search space, a type-1 PDCCH common search space, and/or a UE specific search space. The type-0 PDCCH common search space may be configured at least for monitoring a first uplink DCI format. The type-1 PDCCH common search space may be configured at least for monitoring the first uplink DCI format. The type-0 PDCCH common search space may not be configured for monitoring a second uplink DCI format. The type-1 PDCCH common search space may not be configured for monitoring the second uplink DCI format. The UE specific search space may be configured at least for monitoring some or all of the first uplink DCI format and/or the second uplink DCI format.

Each search space set may be related to one control resource set. Each search space set may be included in one control resource set. An index of a control resource set related to the search space set may be provided to each search space set.

The type-0 PDCCH common search space may be used at least for the DCI format with a cyclic redundancy check (CRC) sequence scrambled by system information-radio network temporary identifier (SI-RNTI). A configuration of a control resource set related at least to the type-0 PDCCH common search space may be provided based at least on a parameter Remaining Minimum System Information (RMSI)-PDCCH-Config of a higher layer. The parameter RMSI-PDCCH-Config of the higher layer may be included in the MIB. The parameter RMSI-PDCCH-Config of the higher layer may indicate at least one of or both the number of resource blocks included in the control resource set related at least to the type-0 PDCCH common search space and the number of OFDM symbols included in the control resource set. The parameter RMSI-PDCCH-Config of the higher layer may be indicated by an information field included in the MIB.

The type-1 PDCCH common search space may be used at least for the DCI format that accompanies a CRC sequence scrambled by a random access-radio network temporary identifier (RA-RNTI), a CRC sequence scrambled by a temporary cell-radio network temporary identifier (TC-RNTI), and/or a CRC sequence scrambled by C-RNTI. The RA-RNTI may be provided based at least on time/frequency resources of a random access preamble transmitted by the terminal apparatus 1. The TC-RNTI may be provided by a PDSCH (also referred to as a message 2 or a random access response grant) scheduled by a DCI format with a CRC sequence scrambled by the RA-RNTI. The C-RNTI may be provided based at least on a PDSCH (also referred to as a message 4 or a contention resolution) scheduled by a DCI format with a CRC sequence scrambled by the TC-RNTI.

The UE specific search space may be used at least for a DCI format with a CRC sequence scrambled by the C-RNTI.

The common control resource set may include at least one of or both the common search space (CSS) and the UE-specific search space (USS). The dedicated control resource set may include at least one of or both the CSS and the USS.

A physical resource of the search space includes a control channel element (CCE) of the control channel. The CCE includes a prescribed number of resource element groups (REGs). For example, the CCE may include six REGs. The REG may include one OFDM symbol in one physical resource block (PRB). In other words, the REG may include twelve resource elements (REs). The PRB is also simply referred to as a resource block (RB).

The PDSCH is used at least to transmit the transport block. The PDSCH may be used at least to transmit a random access message 2 (random access response). The PDSCH may be used at least to transmit system information including a parameter used for an initial access.

In FIG. 1, the following downlink physical signals are used for the downlink radio communication. The downlink physical signals may not be used for transmitting information output from a higher layer but are used by a physical layer.

Synchronization Signal (SS)
Downlink Demodulation Reference Signal (DL DMRS)
Channel state Information-Reference Signal (CSI-RS)
Downlink Phase Tracking Reference Signal (DL PTRS)
Tracking Reference Signal (TRS)

The synchronization signal is used by the terminal apparatus 1 to establish synchronization in the downlink in the frequency domain and/or the time domain. The synchronization signal includes a primary synchronization signal (PSS) and a secondary synchronization signal (SSS).

An SS block (SS/PBCH block) is configured to include at least some or all of the PSS, the SSS, and the PBCH. Antenna ports of some or all of the PSS, the SSS, and the PBCH included in the SS block may be the same. Some or all of the PSS, the SSS, and the PBCH included in the SS block may be mapped to consecutive OFDM symbols. CP configurations of some or all of the PSS, the SSS, and the PBCH included in the SS block may be the same. Subcarrier spacing configurations $\mu$ of some or all of the PSS, the SSS, and the PBCH included in the SS block may be the same.

The DL DMRS is related to transmission of the PBCH, the PDCCH and/or the PDSCH. The DL DMRS is multiplexed with the PBCH, the PDCCH and/or the PDSCH. The terminal apparatuses 1 may use the DL DMRS corresponding to the PBCH, the PDCCH, or the PDSCH in order to perform channel compensation of the PBCH, the PDCCH or the PDSCH. Hereinafter, both the PBCH and the DL DMRS related to the PBCH being transmitted is referred to as the PBCH being transmitted. Hereinafter, both the PDCCH and the DL DMRS related to the PDCCH being transmitted is simply referred to as the PDCCH being transmitted. Also, both the PDSCH and the DL DMRS related to the PDSCH being transmitted is simply referred to as the PDSCH being transmitted. The DL DMRS related to the PBCH is also referred to as a DL DMRS for the PBCH. The DL DMRS related to the PDSCH is also referred to as a DL DMRS for the PDSCH. The DL DMRS related to the PDCCH is also referred to as a DL DMRS related to the PDCCH.

The DL DMRS may be a reference signal individually configured for the terminal apparatus 1. The sequence of the DL DMRS may be provided based at least on a parameter individually configured for the terminal apparatus 1. The sequence of the DL DMRS may be provided based at least on a UE specific value (for example, C-RNTI or the like). The DL DMRS may be individually transmitted for the PDCCH and/or the PDSCH.

The CSI-RS may be a signal used at least to calculate channel state information. A pattern of the CSI-RS assumed by the terminal apparatus may be provided at least by a parameter of a higher layer.

The PTRS may be a signal used at least to compensate for phase noise. A pattern of the PTRS assumed by the terminal apparatus may be provided based at least on a parameter of a higher layer and/or DCI.

The DL PTRS may be related to a DL DMRS group that includes at least an antenna port used for one or a plurality of DL DMRSs. The DL PTRS and the DL DMRS group being associated with each other may mean that at least the antenna port of the DL PTRS and some or all of the antenna ports included in the DL DMRS group are QCL. The DL DMRS group may be identified based at least on the antenna port of the smallest index for the DL DMRS included in the DL DMRS group.

The TRS may be a signal used at least for time and/or frequency synchronization. A pattern of the TRS assumed by the terminal apparatus may be provided based at least on a parameter of a higher layer and/or DCI.

The downlink physical channels and the downlink physical signals are also referred to as downlink signals. The uplink physical channels and the uplink physical signals are also referred to as uplink signals. The downlink signals and the uplink signals are collectively referred to as physical signals. The downlink signals and the uplink signals are also collectively referred to as signals. The downlink physical channels and the uplink physical channels are collectively referred to as physical channels. The downlink physical signals and the uplink physical signals are collectively referred to as physical signals.

The broadcast channel (BCH), the uplink-shared channel (UL-SCH), and the downlink-shared channel (DL-SCH) are transport channels. A channel used in a MAC layer is referred to as a transport channel. A unit of the transport channel used in the MAC layer is also referred to as a TB or a MAC PDU. A hybrid automatic repeat request (HARQ) is controlled for each transport block in the MAC layer. The transport block is a unit of data that the MAC layer delivers to the physical layer. In the physical layer, the transport block is mapped to a codeword, and modulation processing is performed for each codeword.

The base station apparatus 3 and the terminal apparatus 1 exchange (transmit and/or receive) signals of a higher layer through the higher layer. For example, the base station apparatus 3 and the terminal apparatus 1 may transmit and/or receive RRC signaling (a radio resource control (RRC) message, a radio resource control (RRC) information) through the radio resource control (RRC) layer. Furthermore, the base station apparatus 3 and the terminal apparatus 1 may transmit and/or receive a MAC control element (CE) through the MAC layer. Here, the RRC signaling and/or the MAC CE is also referred to as higher layer signaling.

The PUSCH and the PDSCH are used at least to transmit the RRC signaling and/or the MAC CE. Here, the RRC signaling transmitted from the base station apparatus 3 through the PDSCH may be signaling common to a plurality of terminal apparatuses 1 in a serving cell. The signaling common to the plurality of terminal apparatuses 1 in the serving cell is also referred to as common RRC signaling. The RRC signaling transmitted from the base station apparatus 3 through the PDSCH may be signaling dedicated to a certain terminal apparatus 1 (also referred to as dedicated signaling or UE specific signaling). The signaling dedicated to the terminal apparatus 1 is also referred to as dedicated RRC signaling. A parameter of a higher layer specific to a serving cell may be transmitted by using the signaling common to the plurality of terminal apparatuses 1 in the serving cell or the signaling dedicated to a certain terminal apparatus 1. A UE-specific parameter of a higher layer may be transmitted using the signaling dedicated to the certain terminal apparatus 1.

A BCCH, a CCCH, and a DCCH are logical channels. For example, the BCCH is a higher layer channel used to transmit MIB. Also, the CCCH is a higher layer channel used to transmit information common to the plurality of terminal apparatuses 1. Here, the CCCH may be used for a terminal apparatus 1 without RRC connection, for example. Also, the DCCH is a higher layer channel used at least to transmit dedicated control information to the terminal apparatus 1. Here, the DCCH may be used for the terminal apparatus 1 with RRC connection, for example.

The BCCH in the logical channel may be mapped to the BCH, the DL-SCH, or the UL-SCH in the transport channel. The CCCH in the logical channel may be mapped to the DL-SCH or the UL-SCH in the transport channel. The DCCH in the logical channel may be mapped to the DL-SCH or the UL-SCH in the transport channel.

The UL-SCH in the transport channel may be mapped to the PUSCH in the physical channel. The DL-SCH in the transport channel may be mapped to the PDSCH in the physical channel. The BCH in the transport channel may be mapped to the PBCH in the physical channel.

Hereinafter, a configuration example of the terminal apparatus 1 according to an aspect of the present embodiment will be described.

Figure 5:
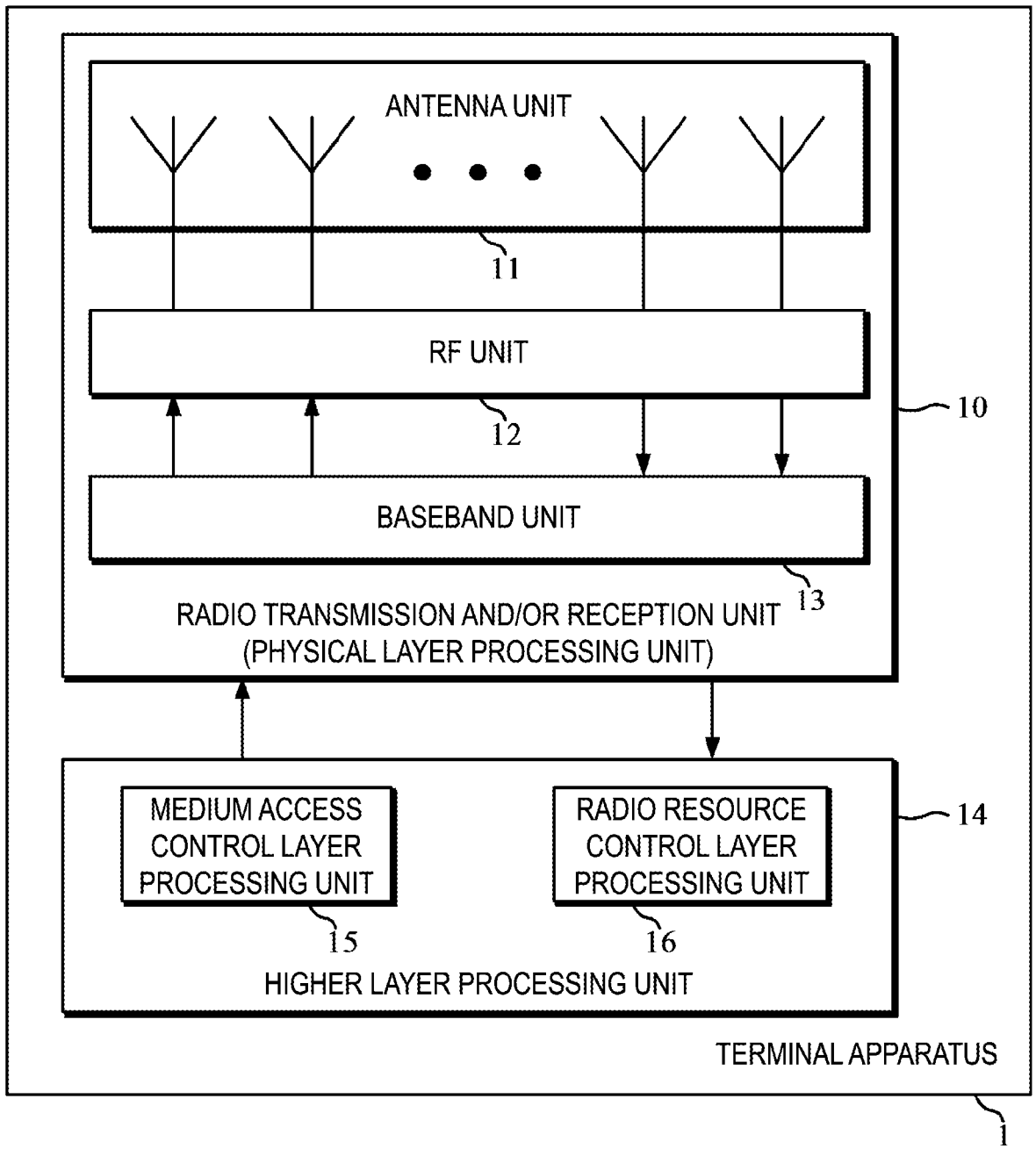
FIG. 5 is a schematic block diagram illustrating a configuration of a terminal apparatus 1 according to an aspect of the present embodiment.

FIG. 5 is a schematic block diagram illustrating a configuration of the terminal apparatus 1 according to an aspect of the present embodiment. As illustrated, the terminal apparatus 1 is configured to include a radio transmission and/or reception unit 10 and a higher layer processing unit 14. The radio transmission and/or reception unit 10 is configured to include at least some or all of an antenna unit 11, a radio frequency (RF) unit 12, and a baseband unit 13. The higher layer processing unit 14 is configured to include at least some or all of a medium access control layer processing unit 15 and a radio resource control layer processing unit 16. The radio transmission and/or reception unit 10 is also referred to as a transmitter, a receiver, or a physical layer processing unit.

The higher layer processing unit 14 outputs uplink data (transport block) generated by a user operation or the like to the radio transmission and/or reception unit 10. The higher layer processing unit 14 performs processing on a MAC layer, a packet data convergence protocol (PDCP) layer, a radio link control (RLC) layer, and an RRC layer.

The medium access control layer processing unit 15 included in the higher layer processing unit 14 performs processing of the MAC layer.

The radio resource control layer processing unit 16 included in the higher layer processing unit 14 performs processing of the RRC layer. The radio resource control layer processing unit 16 manages various types of configuration information/parameters of the terminal apparatus 1 itself. The radio resource control layer processing unit 16 sets various types of configuration information/parameters based on signals of a higher layer received from the base station apparatus 3. In other words, the radio resource control layer processing unit 16 sets the various configuration information/parameters based on the information indicating the various configuration information/parameters received from the base station apparatus 3. The parameters may be parameters of a higher layer.

The radio transmission and/or reception unit 10 performs processing of the physical layer, such as modulation, demodulation, coding, and decoding. The radio transmission and/or reception unit 10 demultiplexes, demodulates, and decodes a received physical signal and outputs the decoded information to the higher layer processing unit 14. The radio transmission and/or reception unit 10 generates a physical signal by performing modulation and coding of data and generating a baseband signal (conversion into a time consecutive signal) and transmits the physical signal to the base station apparatus 3.

The RF unit 12 converts (down-converts) a signal received via the antenna unit 11 into a baseband signal through orthogonal demodulation and removes unnecessary frequency components therefrom. The RF unit 12 outputs a processed analog signal to the baseband unit.

The baseband unit 13 converts the analog signal input from the RF unit 12 into a digital signal. The baseband unit 13 removes a portion corresponding to a cyclic prefix (CP) from the converted digital signal, performs a fast Fourier transform (FFT) on the signal from which the CP has been removed, and extracts a signal in the frequency domain.

The baseband unit 13 generates an OFDM symbol by performing inverse fast Fourier transform (IFFT) on the data, adds CP to the generated OFDM symbol, generates a baseband digital signal, and converts the baseband digital signal into an analog signal. The baseband unit 13 outputs the converted analog signal to the RF unit 12.

The RF unit 12 removes unnecessary frequency components from the analog signal input from the baseband unit 13 using a low-pass filter, up-converts the analog signal into a signal of a carrier frequency, and transmits the up-converted signal via the antenna unit 11. Also, the RF unit 12 amplifies power. In addition, the RF unit 12 may be provided with a function of controlling power to be transmitted. The RF unit 12 will also be referred to as a transmitted power control unit.

Hereinafter, a configuration example of the base station apparatus 3 according to an aspect of the present embodiment will be described.

Figure 6:
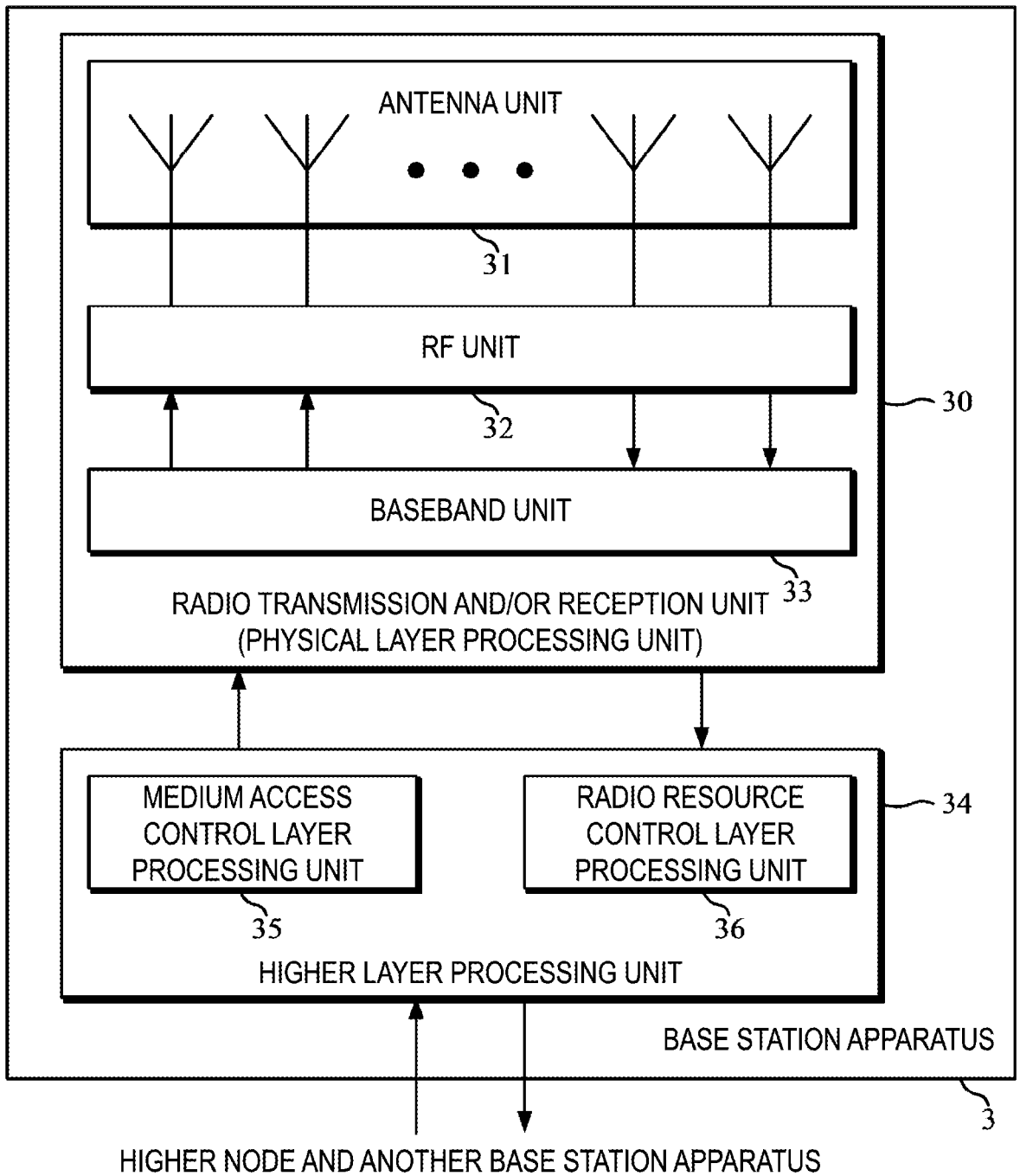
FIG. 6 is a schematic block diagram illustrating a configuration of a base station apparatus 3 according to an aspect of the present embodiment.

FIG. 6 is a schematic block diagram illustrating a configuration of the base station apparatus 3 according to an aspect of the present embodiment. As illustrated, the base station apparatus 3 is configured to include a radio transmission and/or reception unit 30 and a higher layer processing unit 34. The radio transmission and/or reception unit 30 is configured to include an antenna unit 31, an RF unit 32, and a baseband unit 33. The higher layer processing unit 34 is configured to include a medium access control layer processing unit 35 and a radio resource control layer processing unit 36. The radio transmission and/or reception unit 30 will also be referred to as a transmitter, a receiver, or a physical layer processing unit.

The higher layer processing unit 34 performs processing on a MAC layer, a PDCP layer, an RLC layer, and an RRC layer.

The medium access control layer processing unit 35 included in the higher layer processing unit 34 performs processing on the MAC layer.

The radio resource control layer processing unit 36 included in the higher layer processing unit 34 performs processing on the RRC layer. The radio resource control layer processing unit 36 generates, or acquires from a higher node, downlink data (transport block) allocated in a PDSCH, system information, an RRC message, an MAC CE, and the like, and outputs the data to the radio transmission and/or reception unit 30. Also, the radio resource control layer processing unit 36 manages various types of configuration information/parameters for each terminal apparatus 1. The radio resource control layer processing unit 36 may set various types of configuration information/parameters for each terminal apparatus 1 via signals of a higher layer. In other words, the radio resource control layer processing unit 36 transmits/reports information indicating various types of configuration information/parameters.

Since the functions of the radio transmission and/or reception unit 30 are similar to the functions of the radio transmission and/or reception unit 10, description thereof will be omitted.

Each of the units with the reference signs 10 to 16 applied thereto in the terminal apparatus 1 may be configured as a circuit. Each of the units with the reference signs 30 to 36 applied thereto in the base station apparatus 3 may be configured as a circuit.

Hereinafter, various aspect examples will be described.

Figure 7:
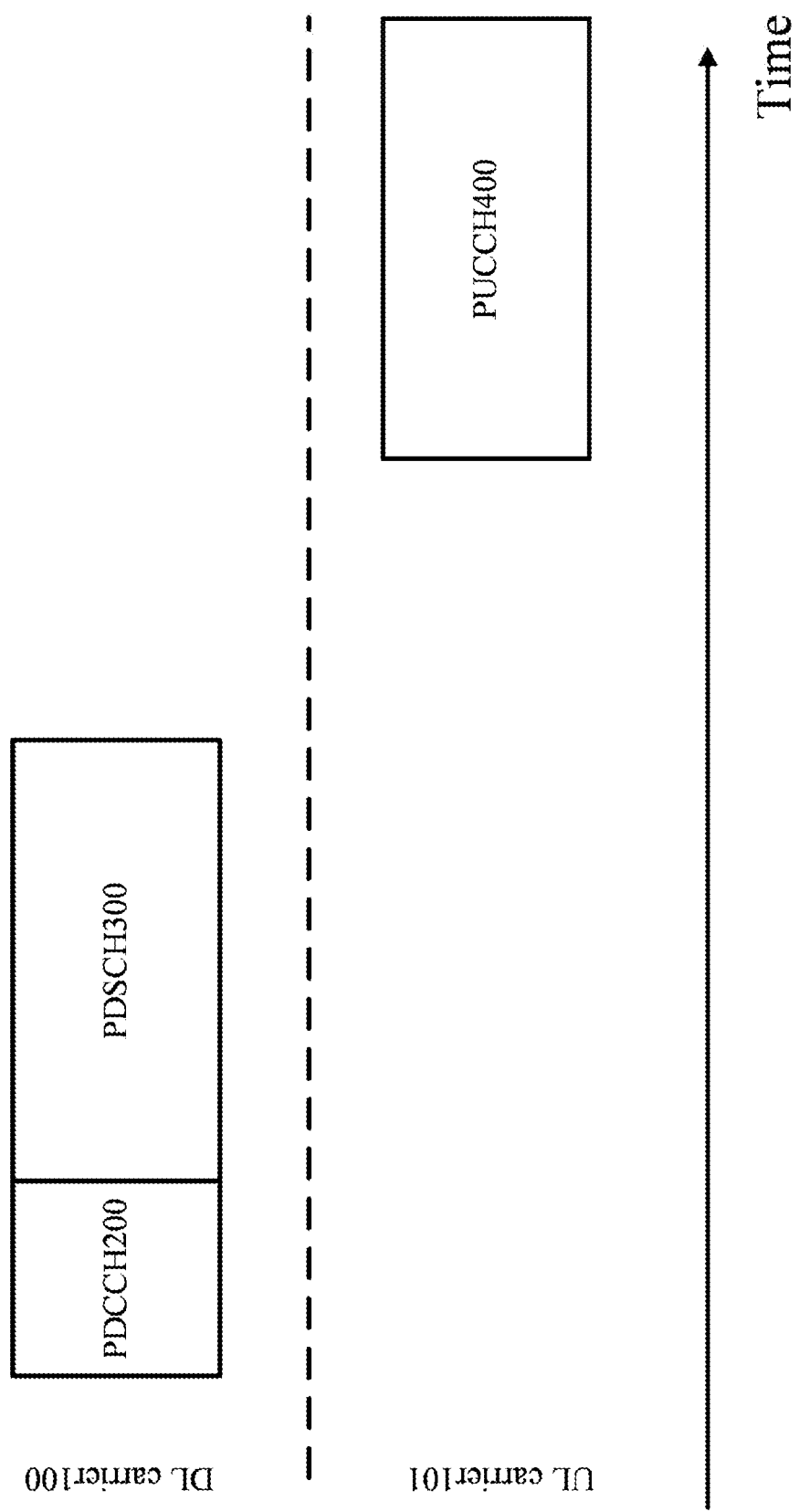
FIG. 7 is a diagram illustrating an example of reception of a transport block and transmission of a HARQ-ACK corresponding to the transport block according to an aspect of the present embodiment.

FIG. 7 is a diagram illustrating an example of reception of a transport block and transmission of a HARQ-ACK corresponding to the transport block according to an aspect of the present embodiment. Through the downlink carrier 100, a PDCCH 200 is transmitted. A DCI format included in the PDCCH 200 indicates frequency resources allocation and/or time resources allocation for PDSCH 300. Through the uplink carrier 101, a PUCCH 400 is transmitted at least with the HARQ-ACK corresponding to the transport block included in the PDSCH 300.

A PUCCH resource of the PUCCH 400 is provided based at least on some or all of a selection procedure 1, a selection procedure 2, and/or a selection procedure 3. The PUCCH resource is identified based at least on some or all of elements P1 to P5.

P1) An index of the PUCCH format
P2) An index of the first OFDM symbol of the PUCCH
P3) The number of OFDM symbols of the PUCCH
P4) An index of the first resource block of the PUCCH
P5) The number of resource blocks of the PUCCH The index of the PUCCH format may indicate any of the values of the PUCCH format 0 to the PUCCH format 4.

The index of the first OFDM symbol of the PUCCH may be an index of the first OFDM symbol to which the PUCCH is mapped. The index of the first OFDM symbol of the PUCCH may be an index of the first OFDM symbol to which the PUCCH is mapped in a certain slot.

The index of the first OFDM symbol of the PUCCH for one or both of the PUCCH format 0 and the PUCCH format 2 may be provided based at least on a parameter PUCCH-F0-F2-starting-symbol of a higher layer. The index of the first OFDM symbol of the PUCCH for some or all of the PUCCH format 1, the PUCCH format 3, and the PUCCH format 4 may be provided based at least on a parameter PUCCH-F1-F3-F4-starting-symbol of a higher layer.

The number of the OFDM symbols of the PUCCH may be the number of OFDM symbols to which the PUCCH is mapped.

The number of the OFDM symbols of the PUCCH for one or both of the PUCCH format 0 and the PUCCH format 2 may be provided based at least on a parameter PUCCH-F0-F2-number-of-symbols of a higher layer. The parameter PUCCH-F0-F2-number-of-symbols of the higher layer may indicate 1 or 2. The number of OFDM symbols of the PUCCH for some or all of the PUCCH format 1, the PUCCH format 3, and the PUCCH format 4 may be provided based at least on a parameter PUCCH-F1-F3-F4-number-of-symbols of a higher layer. The parameter PUCCH-F1-F3-F4-number-of-symbols of a higher layer may indicate any of 4 to 14.

The index of the first resource blocks of the PUCCH may be an index of the first resource blocks to which the PUCCH is mapped.

The number of resource blocks of the PUCCH may be the number of resource blocks to which the PUCCH is mapped. The number of resource blocks of the PUCCH may indicate the maximum number of the resource blocks of the PUCCH. The maximum number of the resource blocks of the PUCCH may be the maximum number of the resource blocks to which the PUCCH is mapped.

The number of the resource blocks of the PUCCH for the PUCCH format 2 may be provided based at least on a parameter PUCCH-F2-number-of-PRBs of a higher layer. The number of the resource blocks of the PUCCH for the PUCCH format 3 may be provided based at least on a parameter PUCCH-F3-number-of-PRBs of a higher layer.

In the selection procedure 1, one PUCCH resource set is selected from among one or a plurality of PUCCH resource sets based at least on $N_{UCI1}$. The PUCCH resource set is configured to include one or a plurality of PUCCH resources. The $N_{UCI1}$ may correspond to the number of bits of the UCI considered in the selection procedure 1.

In a case that $N_{UCI1} \leq$ TH #1, for example, a first PUCCH resource set (also referred to as a PUCCH resource set #1) may be selected. In a case that $N_{UCI1} >$ TH #1 and $N_{UCI1} \leq$ TH #2, a second PUCCH resource set (also referred to as a PUCCH resource set #2) may be selected. In a case that $N_{UCI1} >$ TH #2 and $N_{UCI1} \leq$ TH #3, a third PUCCH resource set (also referred to as a PUCCH resource set #3) may be selected. In a case that $N_{UCI1} >$ TH #3 and $N_{UCI1} \leq$ TH #4, a fourth PUCCH resource set (also referred to as a PUCCH resource set #4) may be selected.

In a case that $N_{UCI1} <$ TH #1, for example, the first PUCCH resource set (also referred to as the PUCCH resource set #1) may be selected. In a case that $N_{UCI1} \geq$ TH #1 and $N_{UCI1} <$ TH #2, the second PUCCH resource set (also referred to as the PUCCH resource set #2) may be selected. In a case that $N_{UCI1} \geq$ TH #2 and $N_{UCI1} <$ TH #3, the third PUCCH resource set (also referred to as the PUCCH resource set #3) may be selected. In a case that $N_{UCI1} \geq$ TH #3 and $N_{UCI1} <$ TH #4, the fourth PUCCH resource set (also referred to as the PUCCH resource set #4) may be selected.

For example, TH #1=2 may be satisfied. Alternatively, TH #1=3 may be satisfied. Some or all of TH #2, TH #3, and TH #4 may be configured based at least on a parameter of a higher layer.

In the selection procedure 2, the PUCCH resource of the PUCCH 400 is selected from among one or a plurality of PUCCH resources included in the PUCCH resource set selected in the selection procedure 1 based at least on a PUCCH resource indicator field included in the DCI format included in the PDCCH 200. The PUCCH resource set selected in selection procedure 1 is a PUCCH resource set input to the selection procedure 2. The index in the PUCCH resource set of the PUCCH resource selected in the selection procedure 2 may correspond to a value set in the PUCCH resource indicator field.

For example, a PUCCH resource corresponding to the value indicated by the PUCCH resource indicator field may be selected from among one or a plurality of PUCCH resources included in the PUCCH resource set.

The selection procedure 3 may be applied at least in a case that the PUCCH format for the selected PUCCH resource is the PUCCH format 2 or the PUCCH format 3 and the HARQ-ACK and/or the SR is transmitted on the PUCCH 400. The selection procedure 3 may be applied at least in a case that the PUCCH format 2 or the PUCCH format 3 is transmitted on the PUCCH 400. In the selection procedure 3, the number $M^{PUCCH}_{RB,min}$ of the actual resource blocks by which the PUCCH 400 is transmitted may be provided based at least on the PUCCH resource selected in the selection procedure 2 and/or $N_{UCI2}$. The number $M^{PUCCH}_{RB,min}$ of the actual resource blocks to which the PUCCH 400 is mapped may be provided based at least on Equation 1 and/or Equation 2.

$$N_{UCI2} \leq M^{PUCCH}_{RB,min} \cdot N^{RB}_{sc,ctrl} \cdot N^{PUCCH}_{symb-UCI} \cdot Q_m \cdot r \quad \text{[Math 1]}$$

$$N_{UCI2} > (M^{PUCCH}_{RB,min} - 1) \cdot N^{RB}_{sc,ctrl} \cdot N^{PUCCH}_{symb-UCI} \cdot Q_m \cdot r \quad \text{[Math 2]}$$

The $N_{UCI2}$ may correspond to the number of bits of UCI considered in the selection procedure 3.

$M^{PUCCH}_{RB}$ for the PUCCH format 2 may be provided based at least on a parameter PUCCH-F2-number-of-PRBs of a higher layer. $M^{PUCCH}_{RB}$ for the PUCCH format 3 may be provided based at least on a parameter PUCCH-F3-number-of-PRBs of a higher layer.

$N^{RB}_{sc,ctrl}$ may correspond to the number of subcarriers to which UCI is mapped in 1 OFDM symbol of one resource block. $N^{RB}_{sc,ctrl}$ for the PUCCH format 2 may be provided by $N^{RB}_{sc,ctrl} = N^{RB}_{sc} - 4$. $N^{RB}_{sc,ctrl}$ for the PUCCH format 3 and/or the PUCCH format 4 may be provided by $N^{RB}_{sc,ctrl} = N^{RB}_{sc}$.

$N^{PUCCH}_{symb-UCI}$ may correspond to the number of OFDM symbols to which at least the UCI is mapped. The $N^{PUCCH}_{symb-UCI}$ for the PUCCH format 2 may be provided by a parameter PUCCH-F0-F2-number-of-symbols of a higher layer. $N^{PUCCH}_{symb-UCI}$ for one or both of the PUCCH format 3 and the PUCCH format 4 may be a value obtained by subtracting the number of OFDM symbols to which DMRS related to the PUCCH 400 is mapped from the value indicated by the parameter PUCCH-F1-F3-F4-number-of-symbols of the higher layer.

$Q_m$ may correspond to a modulation order of the PUCCH 400. $Q_m$ for the PUCCH format 2 may be 2. $Q_m$ for the PUCCH format 3 and/or the PUCCH format 4 may be provided based at least on a parameter PUCCH-PF3-PF4-pi/2BPSK of a higher layer. The parameter PUCCH-PF3-PF4-pi/2BPSK of the higher layer is used to indicate a modulation scheme applied to the PUCCH 400. In a case that the parameter PUCCH-PF3-PF4-pi/2BPSK of the higher layer indicates pi/2 binary phase shift keying (BPSK), $Q_m$ for the PUCCH format 3 and/or the PUCCH format 4 may be 1. In a case that the parameter PUCCH-PF3-PF4-pi/2BPSK of the higher layer indicates quadrature phase shift keying (QPSK), $Q_m$ for the PUCCH format 3 and/or the PUCCH format 4 may be 2.

r may correspond to the maximum coding rate (or also simply referred to as a coding rate) of the PUCCH 400. r for the PUCCH format 2 may be provided based at least on a parameter PUCCH-F2-maximum-coderate of a higher layer. r for the PUCCH format 3 may be provided based at least on a parameter PUCCH-F3-maximum-coderate of a higher layer. r for the PUCCH format 4 may be provided based at least on a parameter PUCCH-F4-maximum-coderate of a higher layer.

$N^{RB}_{sc,ctrl} \cdot N^{PUCCH}_{symb-UCI}$ may correspond to the number of resource elements to which the UCI is mapped per PUCCH 400 mapped to one slot. $N^{RB}_{sc,ctrl} \cdot N^{PUCCH}_{symb-UCI} \cdot Q_m$ may correspond to the number of coding bits of the UCI mapped per resource block.

In a case that $M^{PUCCH}_{RB}=1$, $M^{PUCCH}_{RB,min}$ may satisfy Equation 1, and $M^{PUCCH}_{RB,min}$ may be a minimum value that satisfies a condition of being equal to or less than $M^{PUCCH}_{RB}$. In a case that $M^{PUCCH}_{RB}$ is greater than 1, $M^{PUCCH}_{RB,min}$ may satisfy Equation 1 and Equation 2, and $M^{PUCCH}_{RB,min}$ may be a minimum value that satisfies a condition of being equal to or less than $M^{PUCCH}_{RB}$. In a case that $M^{PUCCH}_{RB,min}=1$, $M^{PUCCH}_{RB,min}$ may satisfy Equation 1, and $M^{PUCCH}_{RB,min}$ may be a minimum value that satisfies a condition of being equal to or less than $M^{PUCCH}_{RB}$. In a case that $M^{PUCCH}_{RB,min}$ is greater than 1, $M^{PUCCH}_{RB,min}$ may satisfy Equation 1 and Equation 2, and $M^{PUCCH}_{RB,min}$ may be a minimum value that satisfies a condition of being equal to or less than $M^{PUCCH}_{RB}$.

In a case that at least the HARQ-ACK is transmitted on the PUCCH 400, $N_{UCI2}=O_{ACK}+O_{CRC0}$ may be satisfied. $O_{ACK}$ is the number of bits of the HARQ-ACK transmitted on the PUCCH 400. $O_{CRC0}$ may correspond to the number of bits of a CRC sequence considered in the selection procedure 3. $O_{CRC0}$ may be provided based at least on $N^{CRC0}_{UCI2}$. $N^{CRC0}_{UCI2}$ may correspond to the number of bits of the UCI considered to calculate the number of bits of the CRC sequence in the selection procedure 3.

In a case that the number of bits of UCI is equal to or less than 11, the number of bits of the CRC sequence may be 0. In a case that the number of bits of UCI is equal to or greater than 12, and the number of bits of the UCI is equal to or less than 19, the number of bits of the CRC sequence may be 6. In a case that the number of bits of UCI is equal to or greater than 20, the number of bits of the CRC sequence may be $11 \times N_c$. $N_c$ is the number of code blocks of the UCI transmitted on the PUCCH 400.

$O_{SR}$ may be provided based at least on the number K of SR PUCCH resources that overlap with the PUCCH 400. Each of the SR PUCCH resources may correspond to at least one SR configuration.

Figure 8:
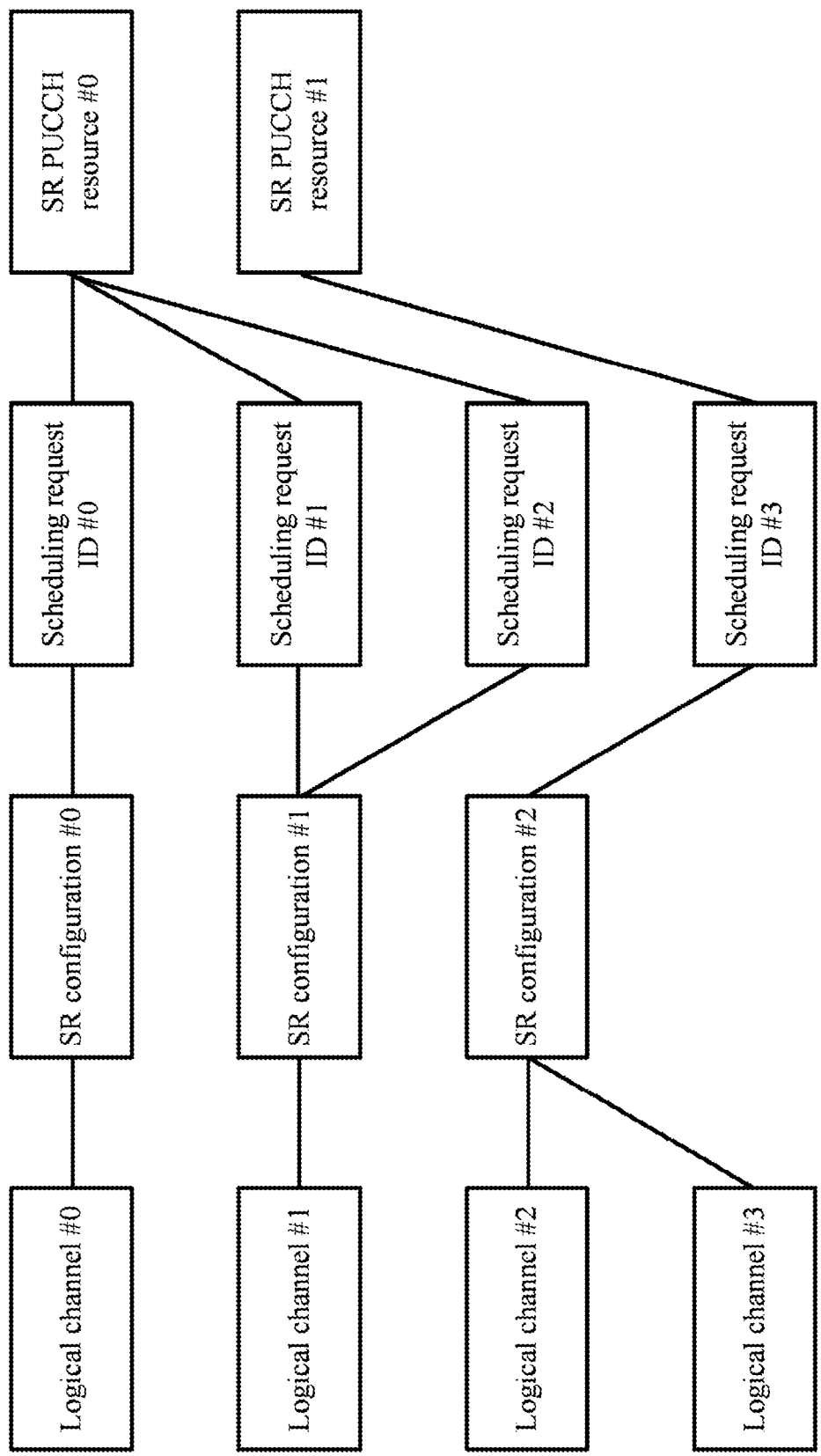
FIG. 8 is a diagram illustrating an example of mapping of a logical channel, an SR configuration, a scheduling request identification (ID), and an SR PUCCH resource according to an aspect of the present embodiment.

FIG. 8 is a diagram illustrating an example of mapping of a logical channel, an SR configuration, a scheduling request ID, and an SR PUCCH resource according to an aspect of the present embodiment. As illustrated in FIG. 8, each of logical channels (logical channels #0 to 3) may correspond at least to any of SR configurations (SR configurations #0 to 2). Each of the SR configurations (SR configurations #0 to 2) may correspond at least to any of scheduling request IDs (scheduling request IDs #0 to 3). Each of the scheduling request IDs may correspond at least to any of SR PUCCH resources (SR PUCCH resources #0 to 3).

Each of the logical channels may correspond at least to one or a plurality of SR configurations. Each of the logical channels may correspond at least to one or a plurality of scheduling request IDs. Each of the logical channels may correspond at least to one or a plurality of SR PUCCH resources.

Each of the SR configurations may correspond at least to one or a plurality of logical channels. Each of the SR configurations may correspond at least to one or a plurality of scheduling request IDs. Each of the SR configurations may correspond at least to one or a plurality of SR PUCCH resources.

Each of the scheduling request IDs may correspond at least to one or a plurality of logical channels. Each of the scheduling request IDs may correspond at least to one or a plurality of SR configurations. Each of the scheduling request IDs may correspond at least one or a plurality of SR PUCCH resources.

Each of the SR PUCCH resources may correspond at least to one or a plurality of logical channels. Each of the SR PUCCH resources may correspond at least to one or a plurality of SR configurations. Each of the SR PUCCH resources may correspond at least to one or a plurality of scheduling request IDs.

In a case that the HARQ-ACK and the SR are transmitted on the PUCCH 400, $N_{UCI0}=O_{ACK}+O_{SR}$ $O_{CRC0}$ may be satisfied. $O_{SR}$ is the number of bits of the scheduling request transmitted on the PUCCH 400.

$N^{CRC0}_{UCI2}$ may be provided based at least on $O_{ACK}$ and $O_{SR}$. $N^{CRC0}_{UCI2}=O_{ACK}+O_{SR}$ may be satisfied.

$N^{CRC0}_{UCI2}$ may be provided based at least on $N_{UCI1}$. $N^{CRC0}_{UCI2}=N_{UCI1}$ may be satisfied. $N^{CRC0}_{UCI2}$ may be provided regardless of the number of bits of the scheduling request. $N^{CRC0}_{UCI2}$ may be provided regardless of the number K of the SR PUCCH resources that overlap with the PUCCH 400. $N^{CRC0}_{UCI2}$ may be provided based at least on the number $K_{configured}$ of configured SR PUCCH resources.

Figure 9:
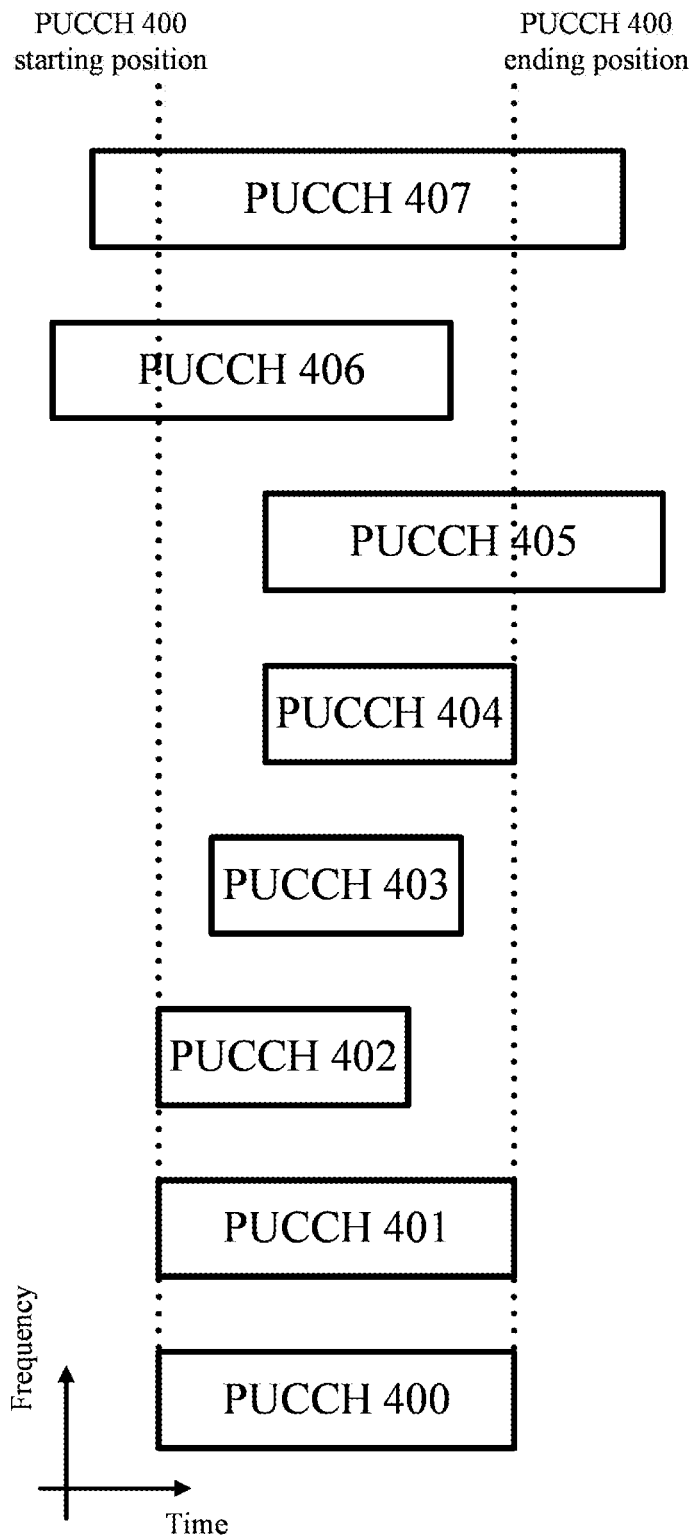
FIG. 9 is a diagram illustrating an example of overlapping between a PUCCH and SR PUCCH resources according to an aspect of the present embodiment.

FIG. 9 is a diagram illustrating an example of overlapping between the PUCCH 400 and the SR PUCCH resources (PUCCH 401 to 407) according to an aspect of the present embodiment. The starting position of the PUCCH 401 and the ending position of the PUCCH 401 coincide with the starting position of the PUCCH 400 and the ending position of the PUCCH 400, respectively. In a case that the starting positions and the ending positions of the two PUCCHs overlap with each other, the two PUCCHs are also referred to as full overlapping (full overlap). The starting positions of the PUCCHs and the ending positions of the PUCCHs may be provided by indexes of OFDM symbols. The starting positions of the two PUCCHs coinciding with each other may mean that indexes of the first OFDM symbols of the two PUCCHs coincide with each other. The ending positions of the two PUCCHs coinciding with each other may mean that indexes of the last OFDM symbols of the two PUCCHs coincide with each other.

Although the starting position of the PUCCH 402 coincides with the starting position of the PUCCH 400, the ending position of the PUCCH 402 comes earlier than the ending position of the PUCCH 400. The starting position of the PUCCH 403 comes later than the starting position of the PUCCH 400, and the ending position of the PUCCH 403 comes earlier than the ending position of the PUCCH 400. The starting position of the PUCCH 404 comes earlier than the starting position of the PUCCH 400, and the ending position of the PUCCH 404 coincides with the ending position of the PUCCH 400. The starting position of the PUCCH 405 comes later than the starting position of the PUCCH 400, and the ending position of the PUCCH 405 comes later than the ending position of the PUCCH 400. The starting position of the PUCCH 406 comes earlier than the starting position of the PUCCH 400, and the ending position of the PUCCH 406 comes earlier than the ending position of the PUCCH 400. The starting position of the PUCCH 407 comes earlier than the starting position of the PUCCH 400, and the ending position of the PUCCH 407 comes later than the ending position of the PUCCH 400. As illustrated in the PUCCH 401 to the PUCCH 407, in a case that at least one or both of the starting positions and/or the ending positions of two PUCCHs are different from each other, the two PUCCHs are referred to as partial overlapping (partial overlap).

The number K of the SR PUCCH resources that overlap with the PUCCH 400 may be provided based at least on some or all of the number of PUCCHs 401, the number of PUCCHs 402, the number of PUCCHs 403, the number of PUCCHs 404, the number of PUCCHs 405, the number of PUCCHs 406, and/or the number of PUCCHs 407.

The number of bits of the scheduling request transmitted on the PUCCH 400 may be provided by ceil(log 2(K+1)). ceil (A) is a ceiling function of A. ceil (A) is a function that outputs a minimum integer value within a range of not less than A. log 2(B) is a logarithmic function of B to base 2.

Figure 10:
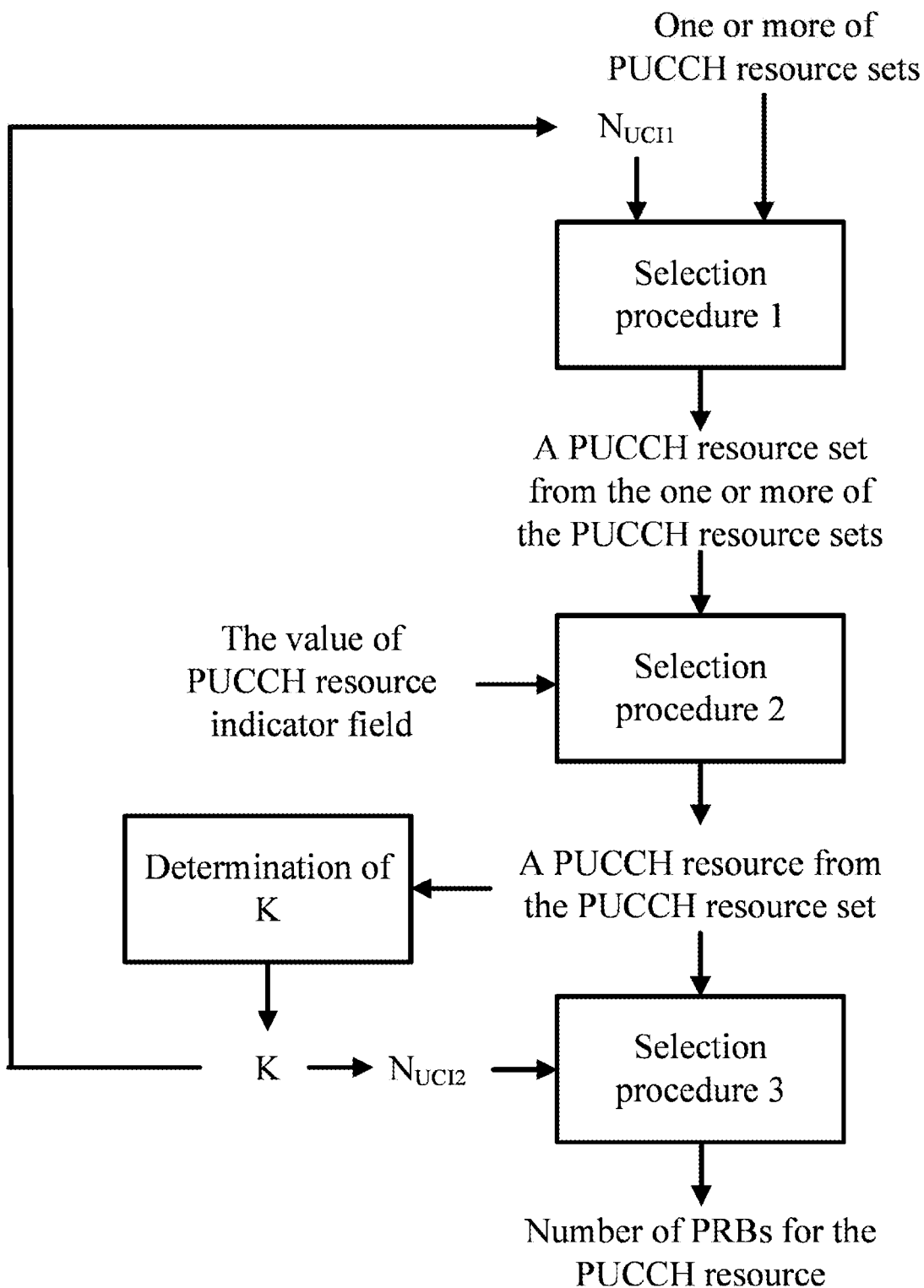
FIG. 10 is a diagram illustrating a schematic method for selecting a PUCCH resource according to an aspect of the present embodiment.

FIG. 10 is a diagram schematically illustrating a method for selecting a PUCCH resource according to an aspect of the present embodiment. First, in the selection procedure 1, one PUCCH resource set is selected based at least on one or a plurality of input PUCCH resource sets and Num. Next, in the selection procedure 2, one PUCCH resource is selected based at least on the selected one PUCCH resource set and/or a PUCCH resource indicator field included in a DCI format included in the PDCCH 200. The number K of SR PUCCH resources that overlap with the PUCCH 400 is provided based at least on the selected one PUCCH resource. Next, $N_{UCI2}$ is provided based at least on K. Next, in the selection procedure 3, the number of actual resource blocks ($M^{PUCCH}_{RB,min}$) for the one PUCCH resource is provided based at least on the input one PUCCH resource and/or Num.

As illustrated in FIG. 10, in a case that $N_{UCI1}$ is provided based at least on K, a problem that a cause-and-effect relationship becomes unclear (also referred to as a chicken-and-egg problem) occurs.

In order to solve the problem illustrated in FIG. 10, a solution 1, a solution 2, and a solution 3 will be described.

Figure 11:
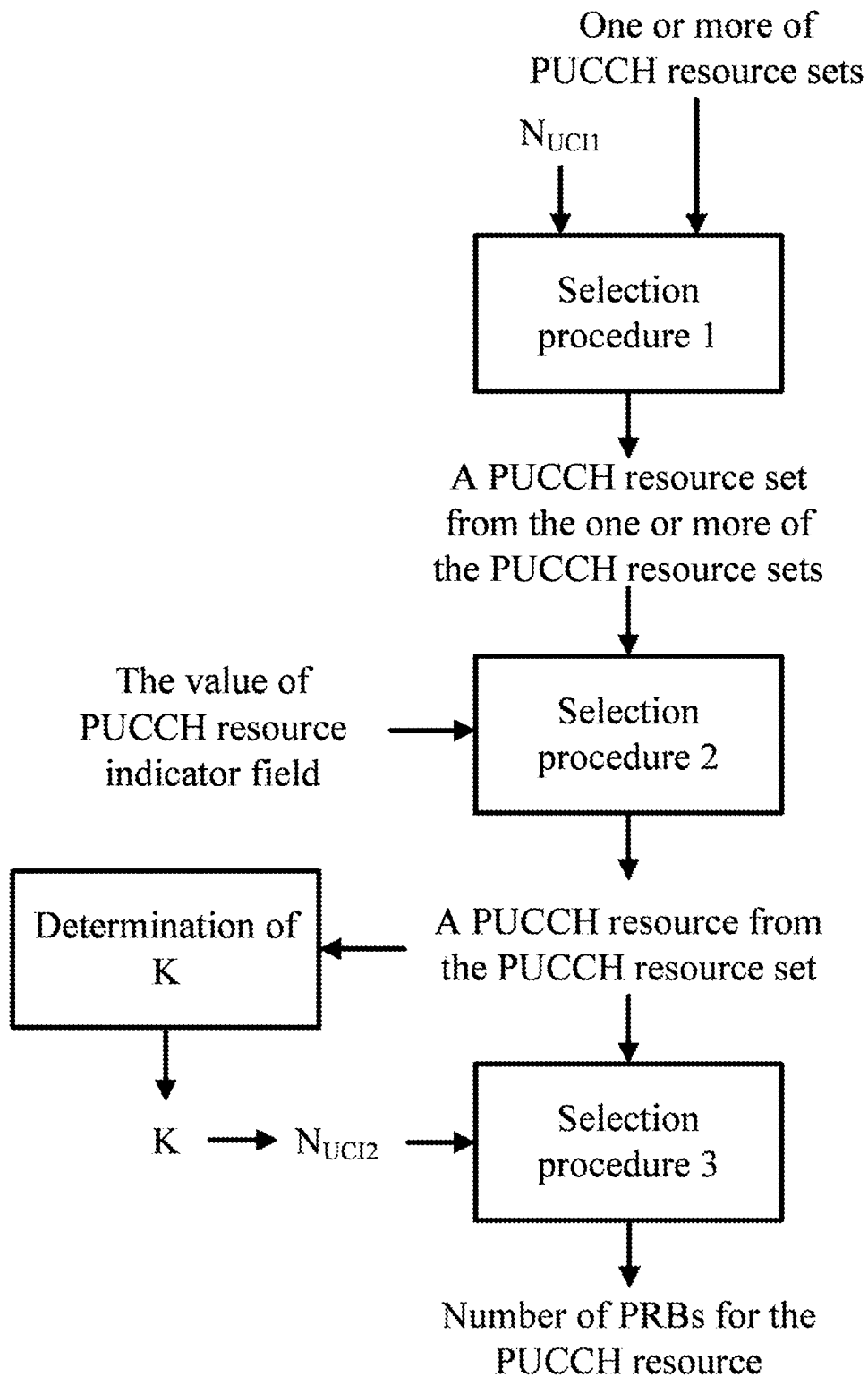
FIG. 11 is a diagram illustrating an example of a solution according to an aspect of the present embodiment.

FIG. 11 is a diagram illustrating an example of the solution 1 according to an aspect of the present embodiment. The solution 1 is a solution based on eliminating the cause-and effect relationship between $N_{UCI1}$ and the number K of the SR PUCCH resources that overlap with the PUCCH 400. In a case that at least a HARQ-ACK is transmitted on the PUCCH 400, $N_{UCI1}$ may be provided based at least on $O_{ACK}$ regardless of the number K of the SR PUCCH resources that overlap with the PUCCH 400. In a case that at least the HARQ-ACK is transmitted on the PUCCH 400, for example, $N_{UCI1}=O_{ACK}$ may be satisfied. In a case that at least the HARQ-ACK is transmitted on the PUCCH 400, $N_{UCI1}=O_{ACK}+O_{CRC1}$ may be satisfied.

In a case that at least the HARQ-ACK is transmitted on the PUCCH 400, $N_{UCI1}$ may be provided based at least on the number $K_{configured}$ of the configured SR PUCCH resources. In a case that at least the HARQ-ACK is transmitted on the PUCCH 400, for example, $N_{UCI1}=O_{ACK}+O_{SR,configured}$ may be satisfied. In a case that at least the HARQ-ACK is transmitted on the PUCCH 400, $N_{UCI1}=O_{ACK}+O_{SR,configured}+O_{CRC1}$ may be satisfied. $O_{SR,configured}$ may be provided based at least on the number $K_{configured}$ of the configured SR PUCCH resources. $O_{SR,configured}$=ceil (log 2 ($K_{configured}$+1)) maybe satisfied.

$O_{CRC1}$ may correspond to the number of bits of the CRC sequence considered in the selection procedure 1. $O_{CRC1}$ may be provided based at least on the number of bits $N^{CRC1}_{UCI1}$ of the UCI sequence considered in the selection procedure 1. In a case that the HARQ-ACK is transmitted on the PUCCH 400, $N^{CRC1}_{UCI1}$ may be provided based at least on $O_{ACK}$ regardless of the number K of the SR PUCCH resources that overlap with the PUCCH 400. In a case that at least the HARQ-ACK is transmitted on the PUCCH 400, for example, $N^{CRC1}_{UCI1}=O_{ACK}$ may be satisfied.

In a case that at least the HARQ-ACK is transmitted on the PUCCH 400, $N^{CRC1}_{UCI1}$ may be provided based at least on the number $K_{configured}$ of the configured SR PUCCH resources. For example, $N^{CRC1}_{UCI1}=O_{ACK}+O_{SR,configured}$ may be satisfied.

In a case that at least the HARQ-ACK bits of equal to or less than $N_{x1}$ bits are transmitted on the PUCCH 400, $N_{UCI1}$ may be provided based at least on $O_{ACK}$ regardless of the value of the number K of the SR PUCCH resources that overlap with the PUCCH 400. In a case that at least the HARQ-ACK bits of equal to or less than $N_{x1}$ bits are transmitted on the PUCCH 400, for example, $N_{UCI1}=O_{ACK}$ may be satisfied. In a case that at least the HARQ-ACK bits of equal to or less than $N_{x1}$ bits are transmitted on the PUCCH 400, $N_{UCI1}=O_{ACK}+O_{CRC1}$ may be satisfied. For example, $N_{x1}$ may be 2. $N_{x1}$=TH #1 may be satisfied.

In a case that at least the HARQ-ACK bits of equal to or less than $N_{x1}$ bits are transmitted on the PUCCH 400, $N_{UCI1}$ may be provided based at least on the number $K_{configured}$ of configured SR PUCCH resources. In a case that at least the HARQ-ACK bits of equal to or less than $N_{x1}$ bits are transmitted on the PUCCH 400, $N_{UCI1}=O_{ACK}+O_{SR,configured}$ may be satisfied. In a case that at least the HARQ-ACK bits of equal to or less than $N_{x1}$ bits are transmitted on the PUCCH 400, $N_{UCI1}=O_{ACK}+O_{SR,configured}+O_{CRC1}$ may be satisfied.

In a case that at least the HARQ-ACK bits of equal to or less than $N_{x1}$ bits are transmitted on the PUCCH 400, $N^{CRC1}_{UCI1}$ may be provided based at least on $O_{ACK}$ regardless of the value of the number K of the SR PUCCH resources that overlap with the PUCCH 400. In a case that at least the HARQ-ACK bits of equal to or less than $N_{x1}$ bits are transmitted on the PUCCH 400, for example, $N^{CRC1}_{UCI1}=O_{ACK}$ may be satisfied.

In a case that at least the HARQ-ACK bits of equal to or less than $N_{x1}$ bits are transmitted on the PUCCH 400, $N^{CRC1}_{UCI1}$ may be provided based at least on the number $K_{configured}$ of the configured SR PUCCH resources. In a case that at least the HARQ-ACK bits of equal to or less than $N_{x1}$ bits are transmitted on the PUCCH 400, for example, $N^{CRC1}_{UCI1}=O_{ACK}+O_{SR,configured}$ may be satisfied.

In a case that at least the HARQ-ACK bits of equal to or less than $N_{x1}$ bits are transmitted on the PUCCH 400, the PUCCH format of the PUCCH resource corresponding to the value of the PUCCH resource indicator field from among PUCCH resources included in the first PUCCH resource set is the PUCCH format 0, and the PUCCH format of the SR PUCCH resource by which a scheduling request is triggered from among K SR PUCCH resources that overlap with the PUCCH 400 is the PUCCH format 0, $N_{UCI1}$ may be provided based at least on $O_{ACK}$ regardless of K.

In a case that at least the HARQ-ACK bits of equal to or less than $N_{x1}$ bits are transmitted on the PUCCH 400, the PUCCH format of the PUCCH resource corresponding to the value of the PUCCH resource indicator field from among the PUCCH resources included in the first PUCCH resource set is the PUCCH format 1, and the PUCCH format of the SR PUCCH resources by which the scheduling request is triggered from among K SR PUCCH resources that overlap with the PUCCH 400 is the PUCCH format 0, transmission of the SR may be dropped.

In a case that at least the HARQ-ACK bits of equal to or less than $N_{x1}$ bits are transmitted on the PUCCH 400, the PUCCH format of the PUCCH resource corresponding to the value of the PUCCH resource indicator field from among the PUCCH resources included in the first PUCCH resource set is the PUCCH format 1, and the PUCCH format of the SR PUCCH resource by which the scheduling request is triggered from among K SR PUCCH resources that overlap with the PUCCH 400 is the PUCCH format 0, $N_{UCI1}$ may be provided based at least on $K_{configured}$ and $O_{ACK}$.

In a case that at least the HARQ-ACK bit that is 1 bit is transmitted on the PUCCH 400, the PUCCH format of the PUCCH resource corresponding to the value of the PUCCH resource indicator field from among the PUCCH resources included in the first PUCCH resource set is the PUCCH format 1, and the PUCCH format of the SR PUCCH resource by which the scheduling request is triggered from among K SR PUCCH resources that overlap with the PUCCH 400 is the PUCCH format 0, $N_{UCI1}$ may be provided based at least on $O_{ACK}$ regardless of K.

In a case that at least the HARQ-ACK bits that are 2 bits are transmitted on the PUCCH 400, the PUCCH format of the PUCCH resource corresponding to the value of the PUCCH resource indicator field from among the PUCCH resources included in the first PUCCH resource set is the PUCCH format 1, and the PUCCH format of the SR PUCCH resource by which the scheduling request is triggered from among K SR PUCCH resources that overlap with the PUCCH 400 is the PUCCH format 0, transmission of the SR may be dropped.

In a case that at least the HARQ-ACK bits that are 2 bits are transmitted on the PUCCH 400, the PUCCH format of the PUCCH resource corresponding to the value of the PUCCH resource indicator field from among the PUCCH resources included in the first PUCCH resource set is the PUCCH format 1, and the PUCCH format of the SR PUCCH resource by which the scheduling request is triggered from among K SR PUCCH resources that overlap with the PUCCH 400 is the PUCCH format 0, $N_{UCI1}$ may be provided based at least on $K_{configured}$ and $O_{ACK}$.

In a case that at least the HARQ-ACK bits of equal to or less than $N_{x1}$ bits are transmitted on the PUCCH 400, the PUCCH format of the PUCCH resource corresponding to the value of the PUCCH resource indicator field from among the PUCCH resources included in the first PUCCH resource set is the PUCCH format 0, and the PUCCH format of the SR PUCCH resource by which the scheduling request is triggered from among K SR PUCCH resources that overlap with the PUCCH 400 is the PUCCH format 1, $N'_{UCI1}$ may be provided based at least on $O_{ACK}$ regardless of K.

In a case that at least the HARQ-ACK bits of equal to or less than $N_{x1}$ bits are transmitted on the PUCCH 400, the PUCCH format of the PUCCH resource corresponding to the value of the PUCCH resource indicator field from among the PUCCH resources included in the first PUCCH resource set is the PUCCH format 1, and the PUCCH format of the SR PUCCH resource by which the scheduling request is triggered from among K SR PUCCH resources that overlap with the PUCCH 400 is the PUCCH format 1, $N_{UCI1}$ may be provided based at least on $O_{ACK}$ regardless of K.

In a case that at least the HARQ-ACK bits of greater than $N_{x1}$ are transmitted on the PUCCH 400, $N_{UCI1}$ may be provided based at least on $O_{ACK}$ regardless of the value of the number K of the SR PUCCH resources that overlap with the PUCCH 400. In a case that at least the HARQ-ACK bits of greater than $N_{x1}$ are transmitted on the PUCCH 400, for example, $N_{UCI1}=O_{ACK}$ may be satisfied. In a case that at least the HARQ-ACK bits of greater than $N_{x1}$ are transmitted on the PUCCH 400, $N_{UCI1}=O_{ACK}+O_{CRC1}$ may be satisfied.

In a case that at least the HARQ-ACK bits of greater than $N_{x1}$ are transmitted on the PUCCH 400, $N_{UCI1}$ may be provided based at least on the number $K_{configured}$ of the configured SR PUCCH resources. In a case that at least the HARQ-ACK bits of greater than $N_{x1}$ are transmitted on the PUCCH 400, for example, $N_{UCI1}=O_{ACK}+O_{SR,configured}$ may be satisfied. In a case that at least the HARQ-ACK bits of greater than $N_{x1}$ are transmitted on the PUCCH 400, $N_{UCI1}=O_{ACK}+O_{SR,configured}+O_{CRC1}$ may be satisfied.

In a case that at least the HARQ-ACK bits of greater than $N_{x1}$ bits are transmitted on the PUCCH 400, $N^{CRC1}_{UCI1}$ may be provided based at least on $O_{ACK}$ regardless of the value of the number K of the SR PUCCH resources that overlap with the PUCCH 400. In a case that at least the HARQ-ACK bits of greater than $N_{x1}$ bits are transmitted on the PUCCH 400, for example, $N^{CRC1}_{UCI1}=O_{ACK}$ may be satisfied.

In a case that at least the HARQ-ACK bits of greater than $N_{x1}$ bits are transmitted on the PUCCH 400, $N^{CRC1}_{UCI1}$ may be provided based at least on the number $K_{configured}$ of the configured SR PUCCH resources. In a case that at least the HARQ-ACK bits of greater than $N_{x1}$ bits are transmitted on the PUCCH 400, for example, $N^{CRC1}_{UCI1}=O_{ACK}+O_{SR,configured}$ may be satisfied.

In a case that at least the HARQ-ACK bits of greater than $N_{x1}$ are transmitted on the PUCCH 400, $N_{UCI0}$ may be provided based at least on $O_{ACK}$ and $O_{SR}$. In a case that at least the HARQ-ACK bits of greater than $N_{x1}$ are transmitted on the PUCCH 400, $N_{UCI1}=O_{ACK}+O_{SR}$ may be satisfied. In a case that at least the HARQ-ACK bits of greater than $N_{x1}$ are transmitted on the PUCCH 400, $N_{UCI1}=O_{ACK}+O_{SR}$ $O_{CRC1}$ may be satisfied.

In a case that at least the HARQ-ACK bits of greater than $N_{x1}$ are transmitted on the PUCCH 400, $N^{CRC1}_{UCI1}$ may be provided based at least on $O_{ACK}$ and $O_{SR}$. In a case that at least the HARQ-ACK bits of greater than $N_{x1}$ are transmitted on the PUCCH 400, $N^{CRC1}_{UCI1}=O_{ACK}+O_{SR}$ may be satisfied.

In a case that the first PUCCH resource set and the second PUCCH resource set are input in the selection procedure 1, and at least the HARQ-ACK bits of equal to or less than $N_{x2}$ bits are transmitted on the PUCCH 400, $N_{UCI1}$ may be provided based at least on $O_{ACK}$ regardless of the value of the number K of the SR PUCCH resources that overlap with the PUCCH 400. In a case that the first PUCCH resource set and the second PUCCH resource set are input in the selection procedure 1, and at least the HARQ-ACK bits of equal to or less than $N_{x2}$ bits are transmitted on the PUCCH 400, $N_{UCI1}=O_{ACK}$ may be satisfied. In a case that the first PUCCH resource set and the second PUCCH resource set are input in the selection procedure 1, and at least the HARQ-ACK bits of equal to or less than $N_{x2}$ bits are transmitted on the PUCCH 400, $N_{UCI1}=O_{ACK}+O_{CRC1}$ may be satisfied. For example, $N_{x2}$ may be 2. $N_{x2}$ may be 3. $N_{x2}$=TH #1 may be satisfied.

In a case that the first PUCCH resource set and the second PUCCH resource set are input in the selection procedure 1, and at least the HARQ-ACK bits of equal to or less than $N_{x2}$ bits are transmitted on the PUCCH 400, $N_{UCI1}$ may be provided based at least on the number $K_{configured}$ of the configured SR PUCCH resources. In a case that the first PUCCH resource set and the second PUCCH resource set are input in the selection procedure 1, and at least the HARQ-ACK bits of equal to or less than $N_{x2}$ bits are transmitted on the PUCCH 400, for example, $N_{UCI1}=O_{ACK}+$ $O_{SR,configured}$ may be satisfied. In a case that the first PUCCH resource set and the second PUCCH resource set are input in the selection procedure 1, and at least the HARQ-ACK bits of equal to or less than $N_{x2}$ bits are transmitted on the PUCCH 400, $N_{UCI1}=O_{ACK}+O_{SR,configured}+O_{CRC1}$ may be satisfied.

In a case that the first PUCCH resource set and the second PUCCH resource set are input in the selection procedure 1, and the HARQ-ACK bits of equal to or less than $N_{x2}$ bits are transmitted on the PUCCH 400, $N^{CRC1}_{UCI1}$ may be provided based at least on $O_{ACK}$ regardless of the value of the number K of the SR PUCCH resources that overlap with the PUCCH 400. In a case that the first PUCCH resource set and the second PUCCH resource set are input in the selection procedure 1, and the HARQ-ACK bits of equal to or less than $N_{x2}$ bits are transmitted on the PUCCH 400, for example, $N^{CRC1}_{UCI1}=O_{ACK}$ may be satisfied.

In a case that the first PUCCH resource set and the second PUCCH resource set are input in the selection procedure 1, and the HARQ-ACK bits of equal to or less than $N_{x2}$ bits are transmitted on the PUCCH 400, $N^{CRC1}_{UCI1}$ may be provided based at least on the number $K_{configured}$ of the configured SR PUCCH resources. In a case that the first PUCCH resource set and the second PUCCH resource set are input in the selection procedure 1, and the HARQ-ACK bits of equal to or less than $N_{x2}$ bits are transmitted on the PUCCH 400, for example, $N^{CRC1}_{UCI1}=O_{ACK}+O_{SR,configured}$ may be satisfied.

In a case that the first PUCCH resource set and the second PUCCH resource set are input in the selection procedure 1, and at least the HARQ-ACK bits of greater than $N_{x2}$ bits are transmitted on the PUCCH 400, $N_{UCI1}$ may be provided based at least on $O_{ACK}$ and $O_{SR}$. In a case that the first PUCCH resource set and the second PUCCH resource set are input in the selection procedure 1, and at least the HARQ-ACK bits of greater than $N_{x2}$ bits are transmitted on the PUCCH 400, for example, $N_{UCI1}=O_{ACK}+O_{SR}+O_{CRC1}$ may be satisfied.

In a case that the first PUCCH resource set and the second PUCCH resource set are input in the selection procedure 1, and at least the HARQ-ACK bits of greater than $N_{x2}$ bits are transmitted on the PUCCH 400, $N^{CRC1}_{UCI1}$ may be provided based at least on $O_{ACK}$ and $O_{SR}$. In a case that the first PUCCH resource set and the second PUCCH resource set are input in the selection procedure 1, and at least the HARQ-ACK bits of greater than $N_{x2}$ bits are transmitted on the PUCCH 400, for example, $N^{CRC1}_{UCI1}=O_{ACK}+O_{SR}$ may be satisfied.

In a case that at least the first PUCCH resource set, the second PUCCH resource set, and the third PUCCH resource set are input in the selection procedure 1, $N_{UCI1}$ may be provided based at least on $O_{ACK}$ regardless of the value of the number K of the SR PUCCH resources that overlap with the PUCCH 400. In a case that at least the first PUCCH resource set, the second PUCCH resource set, and the third PUCCH resource set are input in the selection procedure 1, for example, $N_{UCI1}=O_{ACK}$ may be satisfied. In a case that at least the first PUCCH resource set, the second PUCCH resource set, and the third PUCCH resource set are input in the selection procedure 1, $N_{UCI1}=O_{ACK}+O_{CRC1}$ may be satisfied.

In a case that at least the first PUCCH resource set, the second PUCCH resource set, and the third PUCCH resource set are input in the selection procedure 1, $N_{UCI1}$ may be provided based at least on the number $K_{configured}$ of the configured SR PUCCH resources. In a case that at least the first PUCCH resource set, the second PUCCH resource set, and the third PUCCH resource set are input in the selection procedure 1, for example, $N_{UCI1}=O_{ACK}+O_{SR,configured}$ may be satisfied. In a case that at least the first PUCCH resource set, the second PUCCH resource set, and the third PUCCH resource set are input in the selection procedure 1, $N_{UCI1}=O_{ACK}+O_{SR,configured}+O_{CRC1}$ may be satisfied.

In a case that at least the first PUCCH resource set, the second PUCCH resource set, and the third PUCCH resource set are input in the selection procedure 1, $N^{CRC1}_{UCI1}$ may be provided based at least on $O_{ACK}$ regardless of the value of the number K of the SR PUCCH resources that overlap with the PUCCH 400. In a case that at least the first PUCCH resource set, the second PUCCH resource set, and the third PUCCH resource set are input in the selection procedure 1, for example, $N^{CRC1}_{UCI1}=O_{ACK}$ may be satisfied.

In a case that at least the first PUCCH resource set, the second PUCCH resource set, and the third PUCCH resource set are input in the selection procedure 1, $N^{CRC1}_{UCI1}$ may be provided based at least on the number $K_{configured}$ of the configured SR PUCCH resources. In a case that at least the first PUCCH resource set, the second PUCCH resource set, and the third PUCCH resource set are input in the selection procedure 1, for example, $N^{CRC1}_{UCI1}=O_{ACK}+O_{SR,configured}$ may be satisfied.

Figure 12:
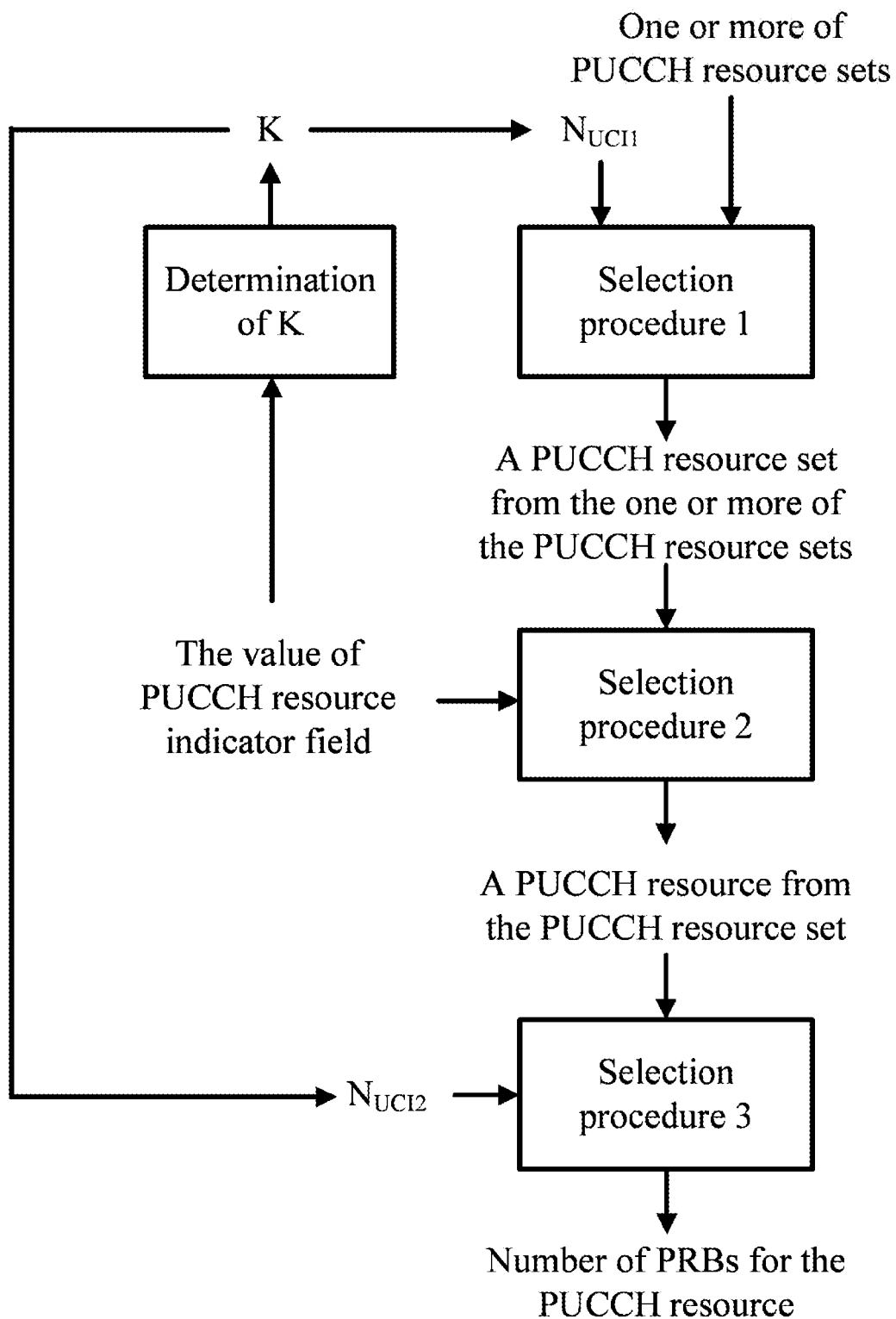
FIG. 12 is a diagram illustrating an example of a solution according to an aspect of the present embodiment.

FIG. 12 is a diagram illustrating an example of a solution 2 according to an aspect of the present embodiment. The solution 2 is a method for calculating the number of SR PUCCH resources that overlap with the PUCCH 400 regardless of the PUCCH resource selected in the selection procedure 2. For example, the number K of the SR PUCCH resources that overlap with the PUCCH 400 may be provided based at least on the value of the PUCCH resource indicator field included in the DCI format included in the PDCCH 200.

The indexes of the first OFDM symbols of the PUCCH for the PUCCH resources with the same PUCCH resource indexes from among the PUCCH resources included in one or a plurality of PUCCH resource sets may be the same. The index of the first OFDM symbol of the PUCCH for the PUCCH resource corresponding to the first index of the first PUCCH resource set and the index of the first OFDM symbol of the PUCCH for the PUCCH resource corresponding to the first index of the second PUCCH resource set may be the same. The indexes of the first OFDM symbols of the PUCCHs may be the starting position of the PUCCHs or start symbols.

The terminal apparatus 1 may not expect that the indexes of the first OFDM symbols of the PUCCH for the PUCCH resources with the same PUCCH resource indexes from among the PUCCH resources included in one or a plurality of PUCCH resource sets are different from each other. The terminal apparatus 1 may not expect that the index of the first OFDM symbol of the PUCCH for the PUCCH resource corresponding to the first index of the first PUCCH resource set and the index of the first OFDM symbol of the PUCCH for the PUCCH resource corresponding to the first index of the second PUCCH resource set are different from each other.

The base station apparatus 3 may configure the indexes of the first OFDM symbols of the PUCCH for the PUCCH resources with the same PUCCH resource indexes from among the PUCCH resources included in one or a plurality of PUCCH resource sets to be the same. The base station apparatus 3 may configure the index of the first OFDM symbol of the PUCCH for the PUCCH resource corresponding to the first index of the first PUCCH resource set to be the same as the index of the first OFDM symbol of the PUCCH for the PUCCH resource corresponding to the first index of the second PUCCH resource set.

The indexes of the last OFDM symbols of the PUCCHs for the PUCCH resources with the same PUCCH resource indexes from among the PUCCH resources included in one or a plurality of PUCCH resource sets may be the same. The index of the last OFDM symbol of the PUCCH for the PUCCH resource corresponding to the first index of the first PUCCH resource set and the index of the last OFDM symbol of the PUCCH for the PUCCH resource corresponding to the first index of the second PUCCH resource set may be the same.

The terminal apparatus 1 may not expect that the indexes of the last OFDM symbols of the PUCCHs for the PUCCH resources with the same PUCCH resource indexes from among the PUCCH resources included in one or a plurality of PUCCH resource sets are different. The terminal apparatus 1 may not expect that the index of the last OFDM symbol of the PUCCH for the PUCCH resource corresponding to the first index of the first PUCCH resource set and the index of the last OFDM symbol of the PUCCH for the PUCCH resource corresponding to the first index of the second PUCCH resource set are different from each other.

The base station apparatus 3 may configure the indexes of the last OFDM symbols of the PUCCHs for the PUCCH resources with the same PUCCH resource indexes from among the PUCCH resources included in one or a plurality of PUCCH resource sets to be the same. The base station apparatus 3 may configure the index of the last OFDM symbol of the PUCCH for the PUCCH resource corresponding to the first index of the first PUCCH resource set and the index of the last OFDM symbol of the PUCCH for the PUCCH resource corresponding to the first index of the second PUCCH resource set to be the same.

The number of OFDM symbols of the PUCCHs for the PUCCH resources with the same PUCCH resource indexes from among the PUCCH resources included in one or a plurality of PUCCH resource sets may be the same. The number of the OFDM symbols of the PUCCHs for the PUCCH resources corresponding to the first index of the first PUCCH resource set and the number of OFDM symbols of the PUCCHs for the PUCCH resources corresponding to the first index of the second PUCCH resource set may be the same.

The terminal apparatus 1 may not expect that the numbers of the OFDM symbols of the PUCCH for the PUCCH resources with the same PUCCH resource indexes from among the PUCCH resources included in one or a plurality of PUCCH resource sets are different. The terminal apparatus 1 may not expect that the number of OFDM symbols of the PUCCHs for the PUCCH resources corresponding to the first index of the first PUCCH resource set and the number of OFDM symbols of the PUCCHs for the PUCCH resources corresponding to the first index of the second PUCCH resource set are different from each other.

The base station apparatus 3 may configure the numbers of the OFDM symbols of the PUCCHs for the PUCCH resources with the same PUCCH resource indexes from among the PUCCH resources included in one or a plurality of PUCCH resource sets to be the same. The base station apparatus 3 may configure the number of OFDM symbols for the PUCCH resources of the first index included in the first PUCCH resource set and the number of OFDM symbols for the PUCCH resources of the first index included in the second PUCCH resource set to be the same.

PUCCH formats applied to the PUCCH resources with the same indexes from among the PUCCH resources included in one or a plurality of PUCCH resource sets may belong to one PUCCH format group. A group to which the PUCCH format including the PUCCH format for the PUCCH resource corresponding to the first index of the first PUCCH resource set belongs to and a group to which the PUCCH format including the PUCCH format for the PUCCH resource corresponding to the first index of the second PUCCH resource set belongs to may be the same. A group to which a certain PUCCH format belongs may be configured to include at least the PUCCH format 0 and/or the PUCCH format 2. A group to which another PUCCH format belongs may be configured to include at least some or all of the PUCCH format 1, the PUCCH format 3, and the PUCCH format 4.

The terminal apparatus 1 may not expect that the groups to which the PUCCH formats for the PUCCH resources with the same PUCCH resource indexes from among the PUCCH resources included in one or a plurality of PUCCH resource sets belong are different. The terminal apparatus 1 may not expect that the group to which the PUCCH format including the PUCCH format for the PUCCH resource corresponding to the first index of the first PUCCH resource set belongs and the group to which the PUCCH format including the PUCCH format for the PUCCH resource corresponding to the first index of the second PUCCH resource set belongs are different from each other.

The base station apparatus 3 may configure the PUCCH formats applied to the PUCCH resources with the same indexes from among the PUCCH resources included in one or a plurality of PUCCH resource sets such that the PUCCH formats belong to one PUCCH format group. The base station apparatus 3 may configure the group to which the PUCCH format including the PUCCH format for the PUCCH resource corresponding to the first index of the first PUCCH resource set belongs and the group to which the PUCCH format including the PUCCH format for the PUCCH resource corresponding to the first index of the second PUCCH resource set to be the same.

The number of the SR PUCCH resources that overlap with the PUCCH 400 may correspond to the number $K_{configured}$ of the SR PUCCH resources configured by the terminal apparatus 1. The number of SR PUCCH resources that overlap with the PUCCH 400 may be set to a prescribed value.

Figure 13:
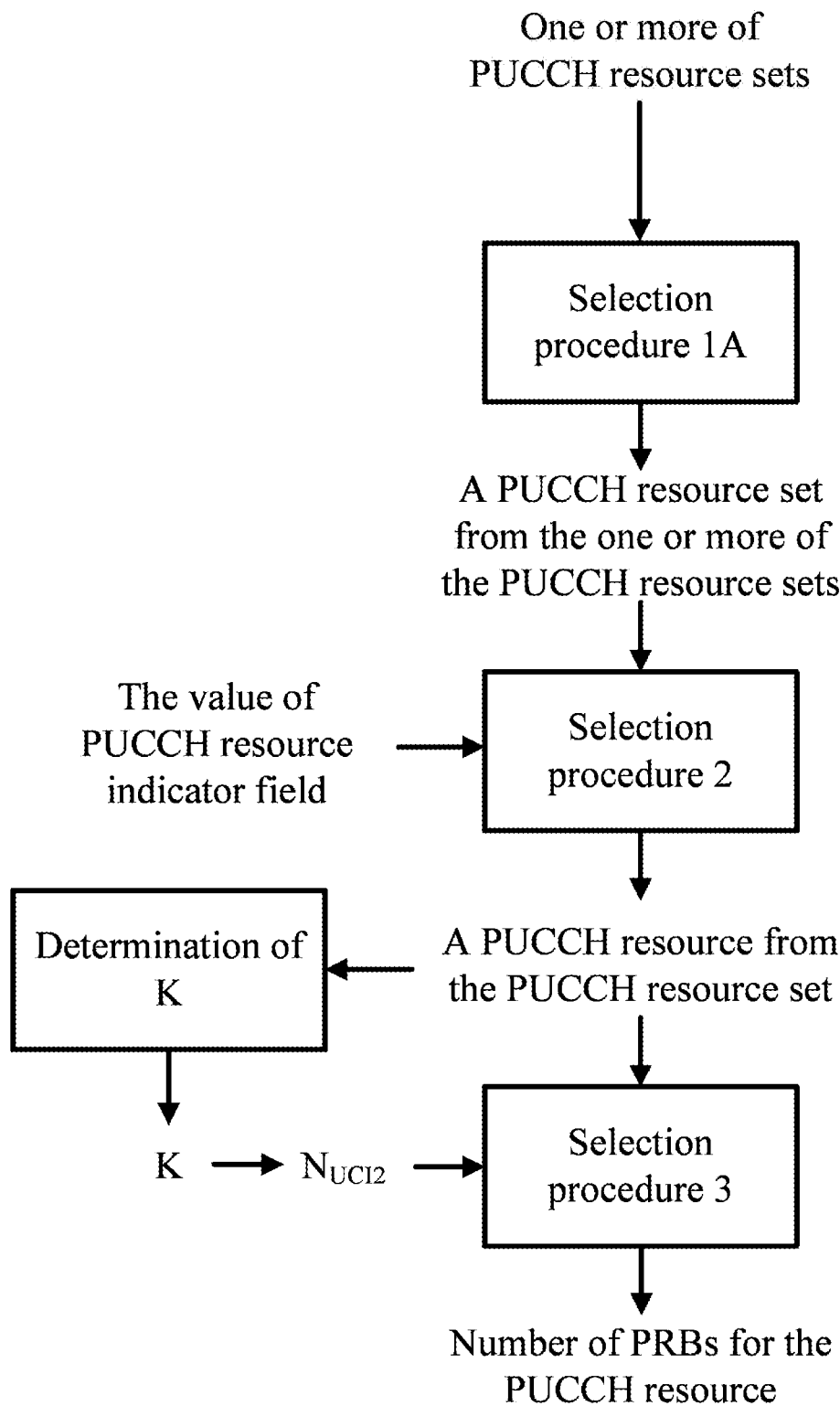
FIG. 13 is a diagram illustrating an example of a solution according to an aspect of the present embodiment.

FIG. 13 is a diagram illustrating an example of a solution 3 according to an aspect of the present embodiment. The solution 3 is a solution based on eliminating a cause-and-effect relationship of $N_{UCI1}$ and the number K of the SR PUCCH resources that overlap with the PUCCH 400. In the solution 3, a PUCCH resource set is selected based on a selection procedure 1A.

Figure 14:
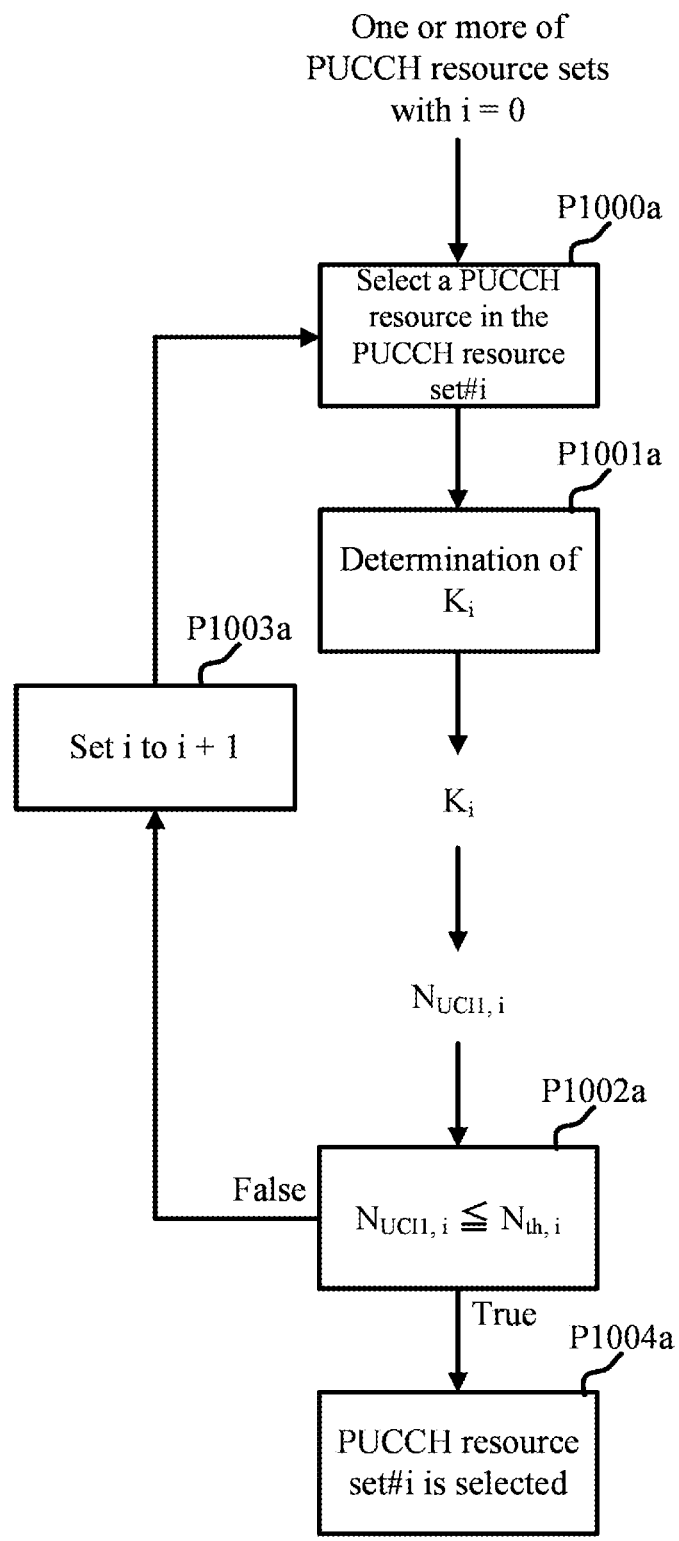
FIG. 14 is a diagram illustrating a procedure example of a selection procedure according to an aspect of the present embodiment.

FIG. 14 is a diagram illustrating a procedure example of the selection procedure 1A according to an aspect of the present embodiment. The selection procedure 1A may be configured to include at least some or all of procedures P1000a to P1004a. In the selection procedure 1A, a PUCCH resource set #1 is selected first from among one or a plurality of PUCCH resource sets. Here, the PUCCH resource set #1 may correspond to the first PUCCH resource set. The PUCCH resource set #i may correspond to an i-th PUCCH resource set. i is any of values of 1 to 4.

In the procedure P1000a, a PUCCH resource is selected based at least on the PUCCH resource set #1 and/or a PUCCH resource indicator field included in a DCI format included in the PDCCH 200 based on the PUCCH resource set #1 being provided.

Next, in the procedure P1001*a*, the number $K_i$ of SR PUCCH resources that overlap with the selected PUCCH resource is determined. $N_{UCI1,i}$ is provided based at least on $K_i$. $N_{UCI,i}$ is a value of $N_{UCI1,i}$ provided based on the number of the SR PUCCH resources that overlap with the selected PUCCH resource being $K_i$.

Next, in a case that $N_{UCI1,i} \leq N_{th,i}$ is not satisfied in the procedure P1002*a* (False), i is set to i+1, and the procedure P1000*a* is then performed. i being set to i+1 may be the PUCCH resource set #i+1 being input to the procedure P1000*a*.

$N_{th,i}$ may correspond to TH #i. In other words, $N_{th,i}$ may correspond to the maximum number of bits of UCI supported in the PUCCH resource set #i.

$N_{th,i}$ may correspond to the value of $N_{UCI0}$ related to the PUCCH format of the selected PUCCH resource. In other words, $N_{th,i}$ may correspond to the maximum number of bits of the UCI supported in the PUCCH format of the PUCCH resource.

In a case that $N_{UCI1,i} \leq N_{th,i}$ is satisfied in the procedure P1002*a* (True), the PUCCH resource set #i is selected, and the PUCCH resource set #i is input to the selection procedure 2.

In the solution 3, the PUCCH resource set input to the selection procedure 2 may be provided based at least on whether or not the PUCCH resource set #i satisfies $N_{UCI1,i} \leq N_{th,i}$. In the solution 3, the PUCCH resource set input to the selection procedure 2 may be provided based at least on $N_{UCI1,i}$ for each of one or a plurality of PUCCH resource sets. In the solution 3, the PUCCH resource set input to the selection procedure 2 may be provided based at least on whether or not $N_{UCI1,i}$ for each of one or a plurality of PUCCH resource sets satisfies $N_{UCI1,i} \leq N_{th,i}$. In the solution 3, the PUCCH resource set input to the selection procedure 2 may be an index of the minimum PUCCH resource set that satisfies $N_{UCI1,i} \leq N_{th,i}$.

In a case that a HARQ-ACK corresponding to a transport block included in the PDSCH 300 is transmitted on the PUCCH 400, and multiplexing of a CSI report 500 in the PUCCH 400 is triggered, a selection measure 3 in the solution 1, the solution 2, or the solution 3 may be a selection measure 3A. Here, the multiplexing of the CSI report 500 in the PUCCH 400 being triggered may be provided based at least on whether or not some or all of the following conditions 1A to 1D are satisfied.

Condition 1A) The CSI report 500 is triggered by the PUCCH 410, and the PUCCH 410 and the PUCCH 400 have fully overlap with each other or have partially overlap with each other.

Condition 1B) A parameter of a higher layer corresponding to the PUCCH format of the PUCCH 400 is set such that the HARQ-ACK and the CSI are multiplexed by the PUCCH.

Condition 1C) The PDSCH 300 is not scheduled by a semi-persistently configured grant (configured grant).

Condition 1D) The CSI report 500 is a periodic CSI report or a CSI report configured to be transmitted on the PUCCH in a semi-persistent manner.

In a case that a HARQ-ACK corresponding to a transport block included in the PDSCH 300 is transmitted on the PUCCH 400, and multiplexing of the CSI report 500 in the PUCCH 400 has been triggered, the value $O_{ACK}$ used to determine $N_{UCI1}$ may be set to $O_{ACK}+O_{CSI0}$. $O_{CSI0}$ may correspond to the number of bits of CSI included in the CSI report 500. $O_{CSI0}$ may be the number of bits of CSI included in a first CSI part in the CSI included in the CSI report 500. CSI may be configured to include at least a first CSI part and a second CSI part. The first CSI part may be configured to include at least RI and/or CQI. The number of bits of the first CSI part may be provided regardless of the value of RI. The number of bits of the first CSI part may be configured to include an additional padding bit such that it is provided regardless of the value of RI. The number of bits of the second CSI part may be provided based at least on the value of RI. The second CSI part may be configured to include at least PMI.

In a case that the HARQ-ACK corresponding to the transport block included in the PDSCH 300 is transmitted to the PUCCH 400, and multiplexing of the CSI report 500 in the PUCCH 400 has been triggered, $N_{UCI1}$ may be provided based at least on $O_{ACK}$ regardless of the number of bits of CSI corresponding to the CSI report 500.

In the solution 1, $O_{CSI0}$ may correspond to the maximum number of bits of CSI transmitted on the PUCCH. $O_{CSI0}$ may be provided based at least on a parameter of a higher layer.

In the solution 3, the value of $O_{ACK}$ used to determine $N_{UCI1,i}$ may be provided based at least on the number of bits of CSI $O_{CSI0,i}$ for the PUCCH resource for a CSI report that overlaps with the PUCCH resource selected from the PUCCH resource set #i.

In a case that the HARQ-ACK corresponding to the transport block included in the PDSCH 300 is transmitted on the PUCCH 400, and multiplexing of the CSI report 500 in the PUCCH 400 has been triggered, the value $O_{ACK}$ used to determine $N^{CRC1}{}_{UCI1}$ may be set to $O_{ACK}+O_{CSI0}$.

In the selection measure 3A, in a case that the PUCCH format for the PUCCH resource selected in the selection measure 2 is the PUCCH format 2, the actual number $M^{PUCCH}{}_{RB,min}$ of the resource blocks with which the PUCCH 400 is transmitted and/or the number $N^{reported}{}_{CSI}$ of CSIs actually reported on the PUCCH 400 may be provided based at least the PUCCH resource and/or $N_{UCI2}$. In a case that Equation 1 is satisfied in the selection procedure 3A, the actual number $M^{PUCCH}{}_{RB,min}$ of the resource blocks with which the PUCCH 400 may be transmitted may be provided based on the selection procedure 3.

In a case that transmission of at least some or all of the HARQ-ACK, the SR, and the CSI on the PUCCH 400 has been triggered, the value $O_{ACK}$ used to determine $N_{UCI2}$ may be set to $O_{ACK}+O_{CSI1}$. $O_{CSI1}$ may correspond to a sum of the number of bits of the first CSI part and the number of bits of the second CSI part included in the CSI report 500.

In a case that Equation 1 is not satisfied in the selection procedure 3A, the number $N^{reported}{}_{CSI}$ of the CSIs actually reported on the PUCCH 400 may be provided based at least on Equations 3 and 4 described below.

$$N_{UCI3} \leq M_{RB}{}^{PUCCH} \cdot N_{sc,ctrl}{}^{RB} \cdot N_{symb\text{-}UCI}{}^{PUCCH} \cdot Q_m \cdot r \qquad \text{[Math 3]}$$

$$N_{UCI4} > M_{RB}{}^{PUCCH} \cdot N_{sc,ctrl}{}^{RB} \cdot N_{symb\text{-}UCI}{}^{PUCCH} \cdot Q_m \cdot r \qquad \text{[Math 4]}$$

Here, $N_{UCI0}$ may be provided based on Equation 5. $N_{UCI4}$ may be provided based on Equation 6.

$$N_{UCI3} = O_{ACK} + O_{SR} + \sum_{n=1}^{N^{reported}_{CSI}} O_{CSI,n} + O_{CRC2} \qquad \text{[Math 5]}$$

-continued $$N_{UCI4} = O_{ACK} + O_{SR} + \sum_{n=1}^{N_{CSI}^{reported}+1} O_{CSI,n} + O_{CRC3}$$ [Math 6]

Here, $O_{CSI,n}$ may be the number of bits of CSI of the n-th CSI report included in the CSI report 500. $O_{CRC2}$ may be the number of bits of a CRC sequence provided based on a sum of the numbers of bits of CSI of the first CSI report to the $N^{reported}_{CSI}$-th CSI report included in the CSI report 500. $O_{CRC3}$ may be the number of bits of the CRC sequence provided based on a sum of the numbers of bits of CSI of the first CSI report to the $N^{reported}_{CSI}+1$-th CSI report included in the CSI report 500.

Hereinafter, various aspects of apparatuses according to one aspect of the present embodiment will be described.

(1) To accomplish the object described above, aspects of the present invention are contrived to provide the following measures. Specifically, a first aspect of the present invention provides a terminal apparatus including: a receiver configured to receive a Physical Downlink Control Channel (PDCCH) and receive a Physical Downlink Shared Channel (PDSCH) scheduled by the PDCCH; and a transmitter configured to transmit, on a Physical Uplink Control Channel (PUCCH), at least a Hybrid Automatic Repeat Request Acknowledgement (HARQ-ACK) corresponding to a transport block included in the PDSCH, in which a PUCCH resource for the PUCCH is a PUCCH resource corresponding to a value indicated by a PUCCH resource indicator field included in a Downlink Control Information (DCI) format included in the PDCCH from among one or a plurality of PUCCH resources included in a PUCCH resource set, the PUCCH resource set is provided based at least on an $N_{UCI1}$ from among one or a plurality of PUCCH resource sets, the $N_{UCI1}$ is provided based at least on the number of HARQ-ACK bits $O_{ACK}$ transmitted on the PUCCH regardless of the number K of Scheduling Request (SR) PUCCH resources that overlap with the PUCCH, and each of the SR PUCCH resources corresponds to one or a plurality of logical channels.

(2) A second aspect of the present invention provides a terminal apparatus including: a receiver configured to receive a Physical Downlink Control Channel (PDCCH) and receive a Physical Downlink Shared Channel (PDSCH) scheduled by the PDCCH; and a transmitter configured to transmit, on a Physical Uplink Control Channel (PUCCH), at least a Hybrid Automatic Repeat Request Acknowledgement (HARQ-ACK) corresponding to a transport block included in the PDSCH, in which a PUCCH resource for the PUCCH is a PUCCH resource corresponding to a value indicated by a PUCCH resource indicator field included in a Downlink Control Information (DCI) format included in the PDCCH from among one or a plurality of PUCCH resources included in a PUCCH resource set, the PUCCH resource set is provided based at least on a $N_{UCI1}$ from among one or a plurality of PUCCH resource sets, first Orthogonal Frequency Division Multiplexing (OFDM) symbols of PUCCH resources with the same indexes from among the PUCCH resources included in each of the one or plurality of PUCCH resource sets are the same, the $N_{UCI1}$ is provided based at least on the number of HARQ-ACK bits $O_{ACK}$ transmitted on the PUCCH and the number K of Scheduling Request (SR) PUCCH resources that overlaps with the PUCCH, and each of the SR PUCCH resources corresponds to one or a plurality of logical channels.

(3) A third aspect of the present invention provides a terminal apparatus including: a receiver configured to receive a Physical Downlink Control Channel (PDCCH) and receive a Physical Downlink Shared Channel (PDSCH) scheduled by the PDCCH; and a transmitter configured to transmit, on a Physical Uplink Control Channel (PUCCH), at least a Hybrid Automatic Repeat Request Acknowledgement (HARQ-ACK) corresponding to a transport block included in the PDSCH, in which a PUCCH resource for the PUCCH is a PUCCH resource corresponding to a value indicated by a PUCCH resource indicator field included in a Downlink Control Information (DCI) format included in the PDCCH from among one or a plurality of PUCCH resources included in a PUCCH resource set, the PUCCH resource set is provided based at least on an NUCI,i related to an i-th PUCCH resource set from among one or a plurality of PUCCH resource sets, and the NUCI,i is included in the i-th PUCCH resource set and is provided based at least on the number K of Scheduling Request (SR) PUCCH resources that overlap with the PUCCH resource corresponding to the PUCCH resource indicator field and the number of HARQ-ACK bits $O_{ACK}$ transmitted on the PUCCH, and each of the SR PUCCH resources corresponds to one or a plurality of logical channels.

(4) A fourth aspect of the present invention provides a base station apparatus including: a transmitter configured to transmit a Physical Downlink Control Channel (PDCCH) that schedules a Physical Downlink Shared Channel (PDSCH) and the PDSCH; and a receiver configured to receive a Physical Uplink Control Channel (PUCCH) transmitted at least with a Hybrid Automatic Repeat Request Acknowledgement (HARQ-ACK) corresponding to a transport block included in the PDSCH, in which a PUCCH resource for the PUCCH is a PUCCH resource corresponding to a value indicated by a PUCCH resource indicator field included in a Downlink Control Information (DCI) format included in the PDCCH from among one or a plurality of PUCCH resources included in a PUCCH resource set, the PUCCH resource set is provided based at least on an $N_{UCI1}$ from among one or a plurality of PUCCH resource sets, the $N_{UCI1}$ is provided based at least on the number of HARQ-ACK bits $O_{ACK}$ transmitted on the PUCCH regardless of the number K of Scheduling Request (SR) PUCCH resources that overlap with the PUCCH, and each of the SR PUCCH resources corresponds to one or a plurality of logical channels.

(5) A fifth aspect of the present invention provides a base station apparatus including: a transmitter configured to transmit a Physical Downlink Control Channel (PDCCH) that schedules a Physical Downlink Shared Channel (PDSCH) and the PDSCH; and a receiver configured to receive a Physical Uplink Control Channel (PUCCH) including at least a Hybrid Automatic Repeat Request Acknowledgement (HARQ-ACK) corresponding to a transport block included in the PDSCH and transmitted, in which a PUCCH resource for the PUCCH is a PUCCH resource corresponding to a value indicated by a PUCCH resource indicator field included in a Downlink Control Information (DCI) format included in the PDCCH from among one or a plurality of PUCCH resources included in a PUCCH resource set, the PUCCH resource set is provided at least on an $N_{UCI1}$ from one or a plurality of PUCCH resource sets, first Orthogonal Frequency Division Multiplexing (OFDM) symbols of PUCCH resources with the same indexes from among PUCCH resources included in each of the one or plurality of PUCCH resource sets are the same, the $N_{UCI1}$ is provided based at least on the number of HARQ-ACK bits $O_{ACK}$ transmitted on the PUCCH and the number K of Scheduling Request (SR) PUCCH resources that overlap with the PUCCH, and each of the SR PUCCH resources corresponds to one or a plurality of logical channels.

(6) A sixth aspect of the present invention provides a base station apparatus including: a transmitter configured to transmit a Physical Downlink Control Channel (PDCCH) that schedules a Physical Downlink Shared Channel (PDSCH) and the PDSCH; and a receiver configured to receive a Physical Uplink Control Channel (PUCCH) transmitted at least with a Hybrid Automatic Repeat Request Acknowledgement (HARQ-ACK) corresponding to a transport block included in the PDSCH, in which a PUCCH resource for the PUCCH is a PUCCH resource corresponding to a value indicated by a PUCCH resource indicator field included in a Downlink Control Information (DCI) format included in the PDCCH from among one or a plurality of PUCCH resources included in a PUCCH resource set, the PUCCH resource set is provided based at least on an NUCI,i related to an i-th PUCCH resource set from among one or a plurality of PUCCH resource sets, the NUCI,i is included in the i-th PUCCH resource set and is provided based at least on the number K of Scheduling Request (SR) PUCCH resources that overlap with the PUCCH resource corresponding to the PUCCH resource indicator field and the number of HARQ-ACK bits $O_{ACK}$ transmitted on the PUCCH, and each of the SR PUCCH resources corresponds to one or a plurality of logical channels.

Each of programs running on the base station apparatus 3 and the terminal apparatus 1 according to an aspect of the present invention may be a program (a program that causes a computer to function) adapted to control a central processing unit (CPU) or the like to realize functions of the aforementioned embodiments according to an aspect of the present invention. Also, the information handled by these apparatuses is temporarily accumulated in a random access memory (RAM) at the time of processing, is then stored in various read only memories (ROMs) such as a flash ROM or hard disk drives (HDDs), and when needed, is read, amended, and overwritten by the CPU.

Note that the terminal apparatus 1 and the base station apparatus 3 according to the aforementioned embodiments may be partially realized by a computer. In that case, this configuration may be realized by recording a program for realizing such control functions on a computer-readable recording medium and causing a computer system to read and execute the program recorded on the recording medium.

Note that it is assumed that the "computer system" mentioned here refers to a computer system that is incorporated in the terminal apparatus 1 or the base station apparatus 3 and includes an OS and hardware such as a peripheral apparatus. Also, a "computer-readable recording medium" refers to a portable medium such as a flexible disk, a magneto-optical disk, a ROM, or a CD-ROM or a storage device such as a hard disk incorporated in the computer system.

Moreover, the "computer-readable recording medium" may also include a medium that dynamically retains a program for a short period of time, such as a communication line in a case that the program is transmitted over a network such as the Internet or over a communication line such as a telephone line, or may also include a medium that retains the program for a fixed period of time, such as a volatile memory included in the computer system functioning as a server or a client in such a case. Also, the aforementioned program may be one for realizing some of the aforementioned functions, and also may be one capable of realizing the aforementioned functions in combination with a program that has already been recorded in the computer system.

Also, the base station apparatus 3 according to the aforementioned embodiments may be realized as an aggregation (apparatus group) including a plurality of apparatuses. Each of the apparatuses included in such an apparatus group may include some or all of each function or each functional block of the base station apparatus 3 according to the aforementioned embodiments. It is only necessary for the apparatus group to have a complete set of functions or functional blocks of the base station apparatus 3. Also, the terminal apparatus 1 according to the aforementioned embodiments can also communicate with the base station apparatus as an aggregation.

In addition, the base station apparatus 3 according to the aforementioned embodiments may be an Evolved Universal Terrestrial Radio Access Network (EUTRA) and/or a Next-Gen (NG) RAN or NR RAN. Also, the base station apparatus 3 according to the aforementioned embodiments may have some or all of the functions of a higher node for an eNodeB and/or a gNB.

Furthermore, some or all portions of the terminal apparatus 1 and the base station apparatus 3 according to the aforementioned embodiments may be typically realized as large scale integrations (LSIs) which are integrated circuits or may be realized as chip sets. The functional blocks of the terminal apparatus 1 and the base station apparatus 3 may be individually achieved as chips, or some or all of the functional blocks may be integrated into a chip. Also, a circuit integration technique is not limited to the LSIs, and may be realized with dedicated circuits or general-purpose processors. In addition, in a case that a circuit integration technology that replaces an LSI appears with advances in semiconductor technology, it is also possible to use an integrated circuit based on the technology.

Also, although the terminal apparatus has been described as an example of a communication apparatus in the aforementioned embodiments, the present invention is not limited to such a terminal apparatus, and is applicable to a terminal apparatus or a communication apparatus of a fixed-type or a stationary-type electronic apparatus installed indoors or outdoors, for example, such as an audio visual (AV) apparatus, a kitchen apparatus, a cleaning or washing machine, an air-conditioning apparatus, office equipment, a vending machine, and other household apparatuses.

Although the embodiments of the present invention have been described above in detail with reference to the drawings, the specific configuration is not limited to the embodiments and includes, for example, design modifications that fall within the scope that does not depart from the gist of the present invention. Also, various modifications are possible within the scope of the present invention defined by claims, and embodiments that are made by appropriately combining technical means disclosed in different embodiments are also included in the technical scope of the present invention. In addition, configurations in which elements described in the aforementioned embodiments and having similar effects are replaced are also included in the technical scope of the present invention.

What is claimed is:

1. A terminal apparatus for Physical Uplink Control Channel (PUCCH) resource selection, the terminal apparatus comprising:
a receiver configured to:
receive a Physical Downlink Control Channel (PDCCH), and receive a Physical Downlink Shared Channel (PDSCH) scheduled by the PDCCH; and a transmitter configured to transmit, on a PUCCH, one or more Hybrid Automatic Repeat Request Acknowledgements (HARQ-ACKs) and a Scheduling Request (SR), wherein the one or more HARQ-ACKs includes at least a HARQ-ACK corresponding to a transport block included in the PDSCH, and wherein:

in a case that a number of bits of the HARQ-ACK is equal to or less than two, a resource of the PUCCH is provided from one or more PUCCH resources included in a first PUCCH resource set based on a first value and a PUCCH resource indicator field, the first value is provided based on at least a number of bits of the one or more HARQ-ACKs transmitted in the PUCCH, regardless of a number of resources of the SR that overlap with the PUCCH, the PUCCH resource indicator field is included in a Downlink Control Information (DCI) format in the PDCCH, and in a case that the number of bits of the HARQ-ACK exceeds two, the resource of the PUCCH is provided from one or more PUCCH resources included in a second PUCCH resource set based on at least a sum of the number of bits of the one or more HARQ-ACKs and the number of resources of the SR.

2. A communication method used by a terminal apparatus for Physical Uplink Control Channel (PUCCH) resource selection, the communication method comprising:

receiving a Physical Downlink Control Channel (PDCCH);

receiving a Physical Downlink Shared Channel (PDSCH) scheduled by the PDCCH; and transmitting, on a PUCCH, one or more Hybrid Automatic Repeat Request Acknowledgements (HARQ-ACKs) and a scheduling request (SR), the one or more HARQ-ACKs including at least a HARQ-ACK corresponding to a transport block included in the PDSCH, wherein:

in a case that a number of bits of the HARQ-ACK is equal to or less than two, a resource of the PUCCH is provided from one or more PUCCH resources included in a first PUCCH resource set based on a first value and a PUCCH resource indicator field, the first value is provided based on at least a number of bits of the one or more HARQ-ACKs transmitted in the PUCCH, regardless of a number of resources of the SR that overlap with the PUCCH, the PUCCH resource indicator field is included in a Downlink Control Information (DCI) format in the PDCCH, and in a case that the number of bits of the HARQ-ACK exceeds two, the resource of the PUCCH is provided from one or more PUCCH resources included in a second PUCCH resource set based on at least a sum of the number of bits of the one or more HARQ-ACKs and the number of resources of the SR.

\* \* \* \* \*